US012795361B2

(12) United States Patent
Faccin et al.

(10) Patent No.: US 12,795,361 B2
(45) Date of Patent: Nov. 10, 2026

(54) METHOD AND APPARATUS FOR VERIFYING MOBILE DEVICE COMMUNICATIONS

(71) Applicant: QUALCOMM Incorporated, San Diego, CA (US)

(72) Inventors: Stefano Faccin, San Ysidro, CA (US); Drew Foster Van Duren, Templeton, CA (US)

(73) Assignee: QUALCOMM Incorporated, San Diego, CA (US)

( * ) Notice: Subject to any disclaimer, the term of this patent is extended or adjusted under 35 U.S.C. 154(b) by 228 days.

(21) Appl. No.: 18/759,228

(22) Filed: Jun. 28, 2024

(65) Prior Publication Data

US 2024/0357356 A1 Oct. 24, 2024

Related U.S. Application Data

(62) Division of application No. 17/217,386, filed on Mar. 30, 2021, now Pat. No. 12,041,449.

(Continued)

(51) Int. Cl.

*H04W 12/069* (2021.01)
*H04L 9/06* (2006.01)

(Continued)

(52) U.S. Cl.

CPC ......... *H04W 12/069* (2021.01); *H04L 9/0643* (2013.01); *H04W 12/065* (2021.01); *H04W 72/0446* (2013.01)

(58) Field of Classification Search

CPC ............. H04W 12/069; H04W 12/065; H04W 72/0446; H04W 28/065; H04W 12/69;

(Continued)

(56) References Cited

U.S. PATENT DOCUMENTS

| | | | |
|---|---|---|---|
| 5,699,431 | A | 12/1997 | Van Oorschot et al. |
| 5,905,719 | A | 5/1999 | Arnold et al. |

(Continued)

FOREIGN PATENT DOCUMENTS

| | | | |
|---|---|---|---|
| CN | 104041098 | A | 9/2014 |
| CN | 110311778 | A | 10/2019 |
| WO | 2020033905 | A1 | 2/2020 |

OTHER PUBLICATIONS

"3rd Generation Partnership Project, Technical Specification Group Services and System Aspects, Remote Identification of Unmanned Aerial Systems, Stage 1 (Release 16)", 3GPP Standard, Technical Report, 3GPP TR 22.825, 3rd Generation Partnership Project (3GPP), Mobile Competence Centre, 650, Route Des Lucioles, F-06921 Sophia-Antipolis Cedex, France, No. V16.0.0, Sep. 21, 2018 (Sep. 21, 2018), pp. 1-22, XP051487099, section 5 .1. 3; p. 8.

(Continued)

*Primary Examiner* — Nimesh Patel
(74) *Attorney, Agent, or Firm* — QUALCOMM IP DEPT.; James Hunt Yancey, Jr.

(57) ABSTRACT

Aspects of the present disclosure include methods, apparatuses, and computer readable media for obtaining at least one certificate, partitioning the at least one certificate into a plurality of certificate segments, embedding the plurality of certificate parts into a corresponding frame of a plurality of frames, and transmitting, sequentially, the plurality of frames at a periodicity.

18 Claims, 13 Drawing Sheets

Related U.S. Application Data

(60) Provisional application No. 63/008,440, filed on Apr. 10, 2020.

(51) Int. Cl.
*H04W 12/065* (2021.01)
*H04W 72/0446* (2023.01)

(58) Field of Classification Search
CPC ....... H04W 4/40; H04W 12/06; H04W 12/08; H04W 12/041; H04W 12/04; H04W 60/04; H04W 4/44; H04W 12/63; H04W 4/021; H04W 48/02; H04W 48/10; H04W 12/0431; H04W 84/042; H04W 4/80; H04W 84/045; H04W 72/04; H04W 12/0433; H04W 84/18; H04W 92/18; H04W 60/001; H04W 72/30; H04W 72/20; H04W 12/086; H04W 12/45; H04W 24/02; H04W 40/04; H04W 52/0212; H04W 72/51; H04B 17/309; H04L 9/0643; H04L 2209/80; H04L 9/3265; H04L 63/0823; H04L 9/3247; H04L 9/3268; H04L 9/3242; H04L 9/3263; H04L 2209/84; H04L 9/30; H04L 9/3213; H04L 63/062; H04L 63/123; H04L 9/0825; H04L 63/10; H04L 63/08; H04L 63/0876; H04L 63/0892; H04L 9/083; H04L 12/189; H04L 65/1073; H04L 63/101; H04L 9/0822; H04L 63/083; H04L 12/1407; G08G 5/57; G08G 5/56; G08G 5/76; G08G 5/25; G08G 5/80; G08G 5/723; G08G 1/017; G08G 5/34
See application file for complete search history.

(56) References Cited

U.S. PATENT DOCUMENTS

| | | | | |
|---|---|---|---|---|
| 6,327,578 | B1 | 12/2001 | Linehan | |
| 6,564,061 | B1 | 5/2003 | Guo et al. | |
| 7,675,190 | B1 | 3/2010 | Müller et al. | |
| 7,756,059 | B1 | 7/2010 | Bharghavan | |
| 9,412,278 | B1 | 8/2016 | Gong et al. | |
| 9,646,502 | B1 * | 5/2017 | Gentry | G06F 21/44 |
| 10,149,159 | B1 | 12/2018 | Perfitt | |
| 10,250,383 | B1 | 4/2019 | Kumar et al. | |
| 12,041,449 | B2 * | 7/2024 | Faccin | H04W 12/069 |
| 2003/0133406 | A1 | 7/2003 | Fawaz et al. | |
| 2003/0212888 | A1 | 11/2003 | Wildish et al. | |
| 2004/0042417 | A1 | 3/2004 | Kennedy | |
| 2004/0090929 | A1 | 5/2004 | Laux et al. | |
| 2004/0165575 | A1 | 8/2004 | Yang et al. | |
| 2005/0125659 | A1 | 6/2005 | Sarfati et al. | |
| 2005/0138365 | A1 * | 6/2005 | Bellipady | H04L 9/3268 713/158 |
| 2006/0253703 | A1 | 11/2006 | Eronen et al. | |
| 2007/0112948 | A1 | 5/2007 | Uhlik | |
| 2007/0130439 | A1 | 6/2007 | Andersson et al. | |
| 2008/0045164 | A1 | 2/2008 | Usuda et al. | |
| 2009/0059811 | A1 | 3/2009 | Wisely et al. | |
| 2009/0131093 | A1 | 5/2009 | Bucknell et al. | |
| 2009/0187983 | A1 | 7/2009 | Zerfos et al. | |
| 2009/0222657 | A1 | 9/2009 | Bender et al. | |
| 2009/0222902 | A1 | 9/2009 | Bender et al. | |
| 2009/0269977 | A1 | 10/2009 | Chen et al. | |
| 2010/0074317 | A1 | 3/2010 | Sun et al. | |
| 2011/0238987 | A1 | 9/2011 | Kherani et al. | |
| 2011/0287790 | A1 | 11/2011 | Haustein et al. | |
| 2012/0210401 | A1 | 8/2012 | Pepin et al. | |
| 2012/0315936 | A1 | 12/2012 | Sawai et al. | |
| 2013/0176874 | A1 | 7/2013 | Xu et al. | |
| 2013/0237190 | A1 | 9/2013 | Smith et al. | |
| 2014/0199953 | A1 | 7/2014 | Blanton et al. | |
| 2014/0298420 | A1 | 10/2014 | Barton et al. | |
| 2016/0244187 | A1 | 8/2016 | Byers et al. | |
| 2016/0274578 | A1 | 9/2016 | Arwine | |
| 2016/0344559 | A1 | 11/2016 | Ma et al. | |
| 2017/0024746 | A1 | 1/2017 | Henry et al. | |
| 2017/0170972 | A1 | 6/2017 | Wu et al. | |
| 2018/0007557 | A1 * | 1/2018 | Lee | H04L 67/12 |
| 2018/0014340 | A1 | 1/2018 | Hill et al. | |
| 2018/0091908 | A1 | 3/2018 | Goel et al. | |
| 2018/0103036 | A1 | 4/2018 | Fox et al. | |
| 2018/0159846 | A1 | 6/2018 | Lee et al. | |
| 2018/0255458 | A1 | 9/2018 | Villar et al. | |
| 2018/0293898 | A1 | 10/2018 | Redmann et al. | |
| 2019/0026435 | A1 | 1/2019 | Benoni | |
| 2019/0051190 | A1 | 2/2019 | Russell et al. | |
| 2019/0087576 | A1 | 3/2019 | Olson | |
| 2019/0200228 | A1 * | 6/2019 | Adrangi | H04L 9/3268 |
| 2019/0276273 | A1 | 9/2019 | Zhang et al. | |
| 2019/0296799 | A1 | 9/2019 | Park | |
| 2019/0297495 | A1 | 9/2019 | Aggarwal et al. | |
| 2019/0372403 | A1 | 12/2019 | Park | |
| 2020/0077321 | A1 * | 3/2020 | Shi | H04W 76/14 |
| 2020/0092110 | A1 | 3/2020 | Zhang et al. | |
| 2020/0162434 | A1 | 5/2020 | Tang et al. | |
| 2020/0178090 | A1 | 6/2020 | Murphy | |
| 2020/0382489 | A1 | 12/2020 | Zhang et al. | |
| 2021/0256857 | A1 | 8/2021 | Wang et al. | |
| 2021/0321255 | A1 | 10/2021 | Faccin et al. | |

OTHER PUBLICATIONS

International Preliminary Report on Patentability—PCT/US2021/025234 The International Bureau of WIPO—Geneva, Switzerland, Oct. 20, 2022.

International Search Report and Written Opinion—PCT/US2021/025234—ISA/EPO—Jul. 14, 2021.

Stevens W.R., et al., "TCP/IP Illustrated", vol. 1 (The Protocols), Addision/Wesley publishing, published Jan. 1994, pp. 34, 36, 224-227.

* cited by examiner

METHOD AND APPARATUS FOR VERIFYING MOBILE DEVICE COMMUNICATIONS

CROSS-REFERENCE TO RELATED APPLICATIONS

The current application is a divisional application of U.S. patent application Ser. No. 17/217,386, filed on Mar. 30, 2021, entitled "Method And Apparatus For Verifying Mobile Device Communications," which claims priority to and the benefit of U.S. Provisional Application No. 63/008,440, filed on Apr. 10, 2020, entitled "Methods and Apparatus for Verifying UAV Communications," the contents of which are hereby incorporated by reference in their entireties.

BACKGROUND

Field of the Disclosure

Aspects of the present disclosure relate generally to wireless communications, and more particularly, to apparatuses and methods for verifying communication messages transmitted by a mobile device, such as an unmanned aerial vehicle (UAV) or other mobile devices.

Description of Related Art

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple technologies have been adopted in various telecommunication standards to provide a common protocol that enables different wireless devices to communicate on a municipal, national, regional, and even global level. For example, a fifth generation (5G) wireless communications technology (which may be referred to as new radio (NR)) is envisaged to expand and support diverse usage scenarios and applications with respect to current mobile network generations. In an aspect, 5G communications technology may include: enhanced mobile broadband addressing human-centric use cases for access to multimedia content, services and data; ultra-reliable-low latency communications (URLLC) with certain specifications for latency and reliability; and massive machine type communications, which may allow a very large number of connected devices and transmission of a relatively low volume of non-delay-sensitive information. As the demand for mobile broadband access continues to increase, however, further improvements in NR communications technology and beyond may be desired.

In a wireless communication network, a mobile device (such as a UAV) may transmit messages to receivers (e.g., other UAVs, UAV controller, base stations, ground controllers, etc.), base stations, and/or the network. As the number of mobile devices in a region increases, however, it may be difficult for the receivers to verify the authenticity and integrity of the transmitted communication messages.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Aspects of the present disclosure include methods for obtaining at least one certificate, partitioning the at least one certificate into a plurality of certificate segments, embedding the plurality of certificate parts into a corresponding frame of a plurality of frames, and transmitting, sequentially, the plurality of frames at a periodicity.

Other aspects of the present disclosure include a mobile device having a memory comprising instructions, a transceiver, and one or more processors operatively coupled with the memory and the transceiver, the one or more processors configured to execute instructions in the memory to obtain at least one certificate, partition the at least one certificate into a plurality of certificate segments, embed the plurality of certificate parts into a corresponding frame of a plurality of frames, and transmit, sequentially, the plurality of frames at a periodicity.

An aspect of the present disclosure includes a mobile device including means for obtaining at least one certificate, means for partitioning the at least one certificate into a plurality of certificate segments, means for embedding the plurality of certificate parts into a corresponding frame of a plurality of frames, and means for transmitting, sequentially, the plurality of frames at a periodicity.

Some aspects of the present disclosure include non-transitory computer readable media having instructions stored therein that, when executed by one or more processors of a mobile device, cause the one or more processors to obtain at least one certificate, partition the at least one certificate into a plurality of certificate segments, embed the plurality of certificate parts into a corresponding frame of a plurality of frames, and transmit, sequentially, the plurality of frames at a periodicity.

Aspects of the present disclosure include methods by a receiver for receiving a broadcast remote identification from a mobile device having a mobile device identification, receiving a certificate associated to the mobile device identification, and verifying an authenticity of the broadcast remote identification using the certificate.

Other aspects of the present disclosure include a receiver having a memory comprising instructions, a transceiver, and one or more processors operatively coupled with the memory and the transceiver, the one or more processors configured to execute instructions in the memory to receive a broadcast remote identification from a mobile device having a mobile device identification, receive a certificate associated to the mobile device identification, and verify an authenticity of the broadcast remote identification using the certificate.

An aspect of the present disclosure includes a receiver including means for receiving a broadcast remote identification from a mobile device having a mobile device identification, means for receiving a certificate associated to the mobile device identification, and means for verifying an authenticity of the broadcast remote identification using the certificate.

Some aspects of the present disclosure include non-transitory computer readable media having instructions stored therein that, when executed by one or more processors of a receiver, cause the one or more processors to receive a broadcast remote identification from a mobile device having a mobile device identification, receive a certificate associated to the mobile device identification, and verify an authenticity of the broadcast remote identification using the certificate.

Aspects of the present disclosure include methods by a base station (BS) for receiving a certificate or a component of the certificate associated with a mobile device having a mobile device identification (ID) from a core network, and transmitting the certificate.

Other aspects of the present disclosure include a base station (BS) having a memory comprising instructions, a transceiver, and one or more processors operatively coupled with the memory and the transceiver, the one or more processors configured to execute instructions in the memory to receive a certificate or a component of the certificate associated with a mobile device having a mobile device identification (ID) from a core network, and transmit the certificate.

An aspect of the present disclosure includes a base station (BS) including means for receiving a certificate or a component of the certificate associated with a mobile device having a mobile device identification (ID) from a core network, and means for transmitting the certificate.

Some aspects of the present disclosure include non-transitory computer readable media having instructions stored therein that, when executed by one or more processors of a base station (BS), cause the one or more processors to receive a certificate or a component of the certificate associated with a mobile device having a mobile device identification (ID) from a core network, and transmit the certificate.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
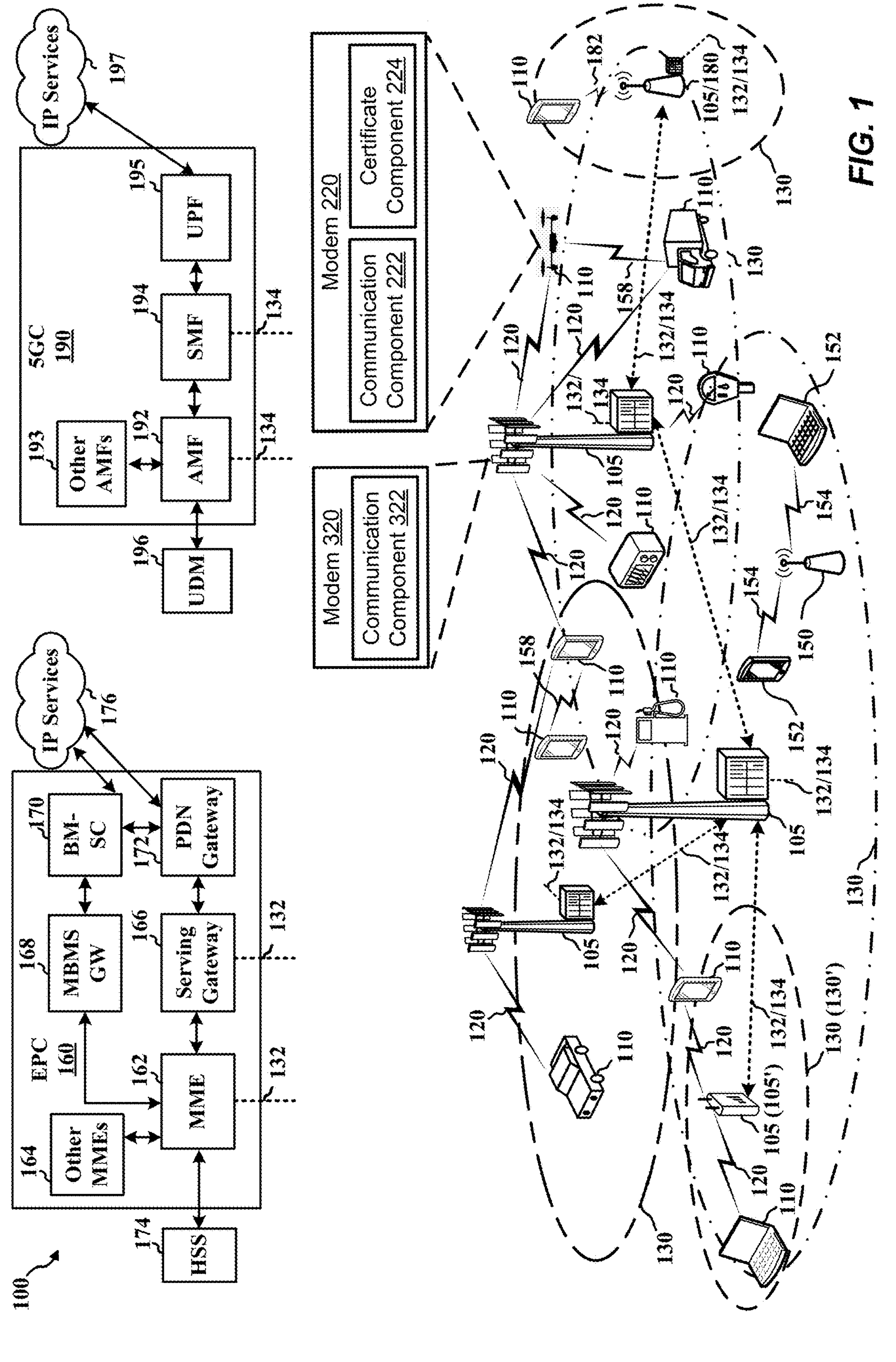
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media.

Storage media may be any available media that may be accessed by a computer. By way of example, and not limitation, such computer-readable media may comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

In an implementation, a UAV may partition a certificate into segments. The UAV may embed each segment of the certificate into a frame. The frames containing the segments of the partition may be sequentially transmitted by the UAV. The UAV may transmit a broadcast remote identification. Receivers of the broadcast remote identification and/or the certificate segments may append the certificate segments into a certificate to be used to authenticate the broadcast remote identification.

In an implementation, the broadcast remote identification may be a mobile identification (associated with the mobile device or UAV) declared during the broadcasting process. In other instances, the broadcast remote identification may be the certificate associated to or containing the mobile identification. The mobile identification may be a serial number, a government issued identifier, a universal unique identification, etc.

FIG. 1 is a diagram illustrating an example of a wireless communications system and an access network 100. The wireless communications system (also referred to as a wireless wide area network (WWAN)) includes at least one BS 105, UEs 110, an Evolved Packet Core (EPC) 160, and a 5G Core (5GC) 190. The BS 105 may include macro cells (high power cellular base station) and/or small cells (low power cellular base station). The macro cells include base stations. The small cells include femtocells, picocells, and microcells. In one implementation, the UE 110 may include a communication component 222. The communication component 222 and/or a modem 220 of the UE 110 may be configured to communicate with the BS 105 or other UEs 110 via a cellular network, a Wi-Fi network, or other wireless and wired networks. The UE 110 may include a certificate component 224 that retrieves the certificate, partitions the certificate, and/or embeds the certificate segments into frames. In some implementations, the BS 105 may include a communication component 322 configured to communicate with the UE 110.

A BS 105 configured for 4G LTE (collectively referred to as Evolved Universal Mobile Telecommunications System (UMTS) Terrestrial Radio Access Network (E-UTRAN)) may interface with the EPC 160 through backhaul links interfaces 132 (e.g., S1, X2, Internet Protocol (IP), or flex interfaces). A BS 105 configured for 5G NR (collectively referred to as Next Generation RAN (NG-RAN)) may interface with 5GC 190 through backhaul links interfaces 134 (e.g., S1, X2, Internet Protocol (IP), or flex interface). In addition to other functions, the BS 105 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The BS 105 may communicate directly or indirectly (e.g., through the EPC 160 or 5GC 190) with each other over the backhaul links interfaces 134. The backhaul links 132, 134 may be wired or wireless.

The BS 105 may wirelessly communicate with the UEs 110. Each of the BS 105 may provide communication coverage for a respective geographic coverage area 130. There may be overlapping geographic coverage areas 130. For example, the small cell 105' may have a coverage area 130' that overlaps the coverage area 130 of one or more macro BS 105. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the BS 105 and the UEs 110 may include uplink (UL) (also referred to as reverse link) transmissions from a UE 110 to a BS 105 and/or downlink (DL) (also referred to as forward link) transmissions from a BS 105 to a UE 110. The communication links 120 may use multiple-input and multiple-output (MIMO) antenna technology, including spatial multiplexing, beamforming, and/or transmit diversity. The communication links may be through one or more carriers. The BS 105/UEs 110 may use spectrum up to Y MHz (e.g., 5, 10, 15, 20, 100, 400, etc. MHz) bandwidth per carrier allocated in a carrier aggregation of up to a total of $Y_x$ MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 110 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 105' may operate in a licensed and/or an unlicensed frequency spectrum. When operating in an unlicensed frequency spectrum, the small cell 105' may employ NR and use the same 5 GHz unlicensed frequency spectrum as used by the Wi-Fi AP 150. The small cell 105', employing NR in an unlicensed frequency spectrum, may boost coverage to and/or increase capacity of the access network.

A BS 105, whether a small cell 105' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 110. When the gNB 180 operates in mmW or near mmW frequencies, the gNB 180 may be referred to as an mmW base station. Extremely high frequency (EHF) is part of the radio frequency (RF) in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHZ and 30 GHZ, also referred to as centimeter wave. Communications using the mmW/near mmW radio frequency band has extremely high path loss and a short range. The mmW base station 180 may utilize beamforming 182 with the UE 110 to compensate for the path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 110 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the BS 105 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 110 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The BS 105 may also be referred to as a gNB, Node B, evolved Node B (eNB), an access point, a base transceiver station, a radio base station, an access point, an access node, a radio transceiver, a NodeB, eNodeB (eNB), gNB, Home NodeB, a Home eNodeB, a relay, a transceiver function, a basic service set (BSS), an extended service set (ESS), a transmit reception point (TRP), or some other suitable terminology. The BS 105 provides an access point to the EPC 160 or 5GC 190 for a UE 110. Examples of UEs 110 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 110 may be referred to as IoT devices (e.g., parking meter, gas pump, toaster, vehicles, heart monitor, etc.). The UE 110 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In some examples, the UE 110 may include, be a part of, or the same as a mobile device, UAV, UAS, etc.

Figure 2:
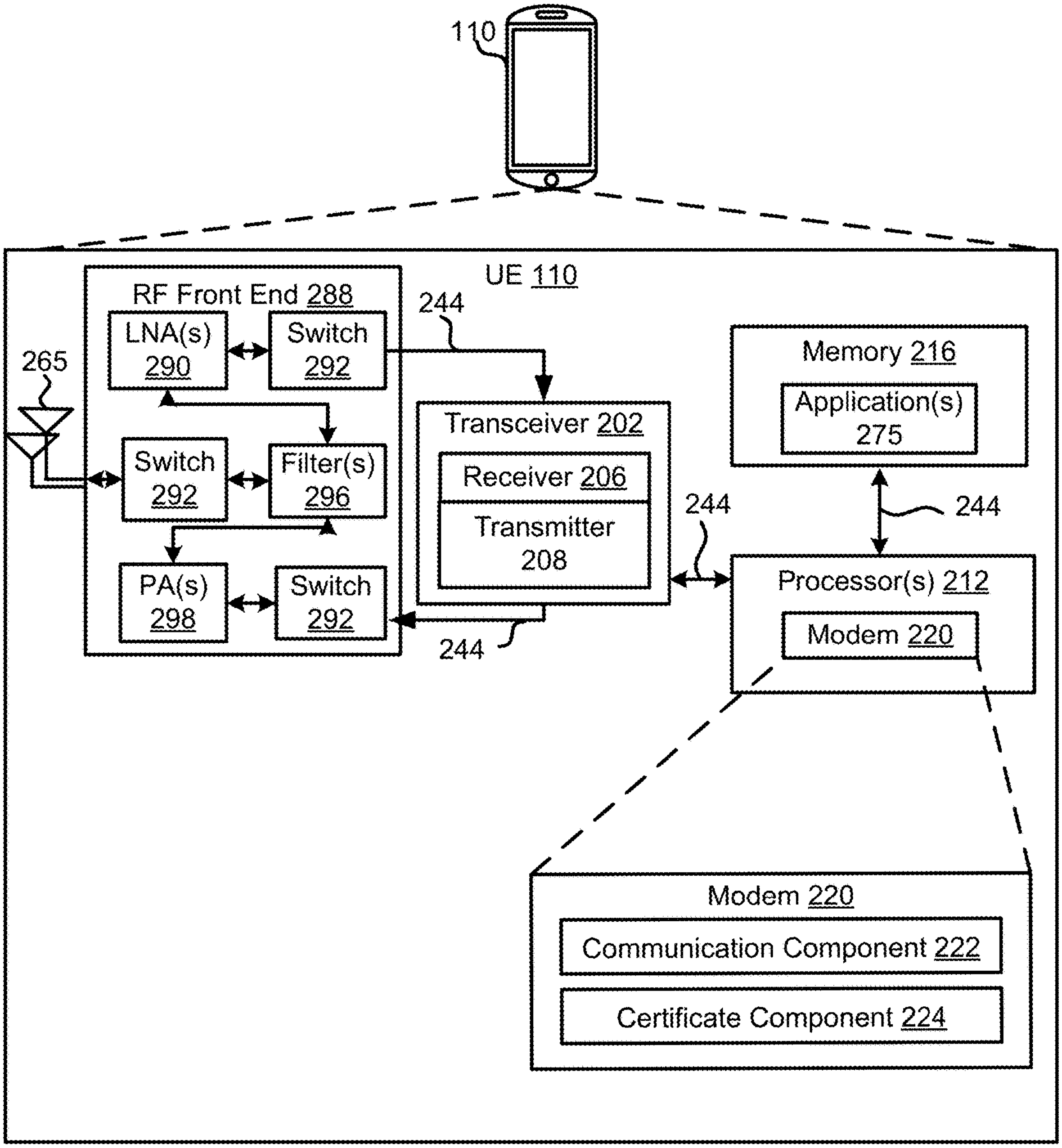
FIG. 2 is a schematic diagram of an example of a user equipment, such as a mobile device or UAV.

Referring to FIG. 2, one example of an implementation of the UE 110 may include a modem 220 having a communication component 222. The communication component 222 and/or the modem 220 of the UE 110 may be configured to communicate with the BS 105 via a cellular network, a Wi-Fi network, or other wireless and wired networks. The certificate component 224 may retrieves the certificate, partitions the certificate, and/or embeds the certificate segments into frames.

In some implementations, the UE 110 may include a variety of components, including components such as one or more processors 212 and memory 216 and transceiver 202 in communication via one or more buses 244, which may operate in conjunction with the modem 220 and the communication component 222 to enable one or more of the functions described herein related to communicating with the BS 105. Further, the one or more processors 212, modem 220, memory 216, transceiver 202, RF front end 288 and one or more antennas 265, may be configured to support voice and/or data calls (simultaneously or non-simultaneously) in one or more radio access technologies. The one or more antennas 265 may include one or more antennas, antenna elements and/or antenna arrays.

In an aspect, the one or more processors 212 may include the modem 220 that uses one or more modem processors. The various functions related to the communication component 222 and/or the certificate component 224 may be included in the modem 220 and/or processors 212 and, in an aspect, may be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiving device processor, or a transceiver processor associated with transceiver 202. Additionally, the modem 220 may configure the UE 110 along with the processors 212. In other aspects, some of the features of the one or more processors 212 and/or the modem 220 associated with the communication component 222 and/or the certificate component 224 may be performed by transceiver 202.

Also, memory 216 may be configured to store data used herein and/or local versions of applications 275 or the communication component 222, the certificate component

224 and/or one or more subcomponents of the communication component 222 and/or the certificate component 224 being executed by at least one processor 212. Memory 216 may include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining the communication component 222, the certificate component 224, and/or one or more of its subcomponents, and/or data associated therewith, when UE 110 is operating at least one processor 212 to execute the communication component 222, the certificate component 224, and/or one or more of the subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a RF receiving device. In an aspect, the receiver 206 may receive signals transmitted by at least one BS 105. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 110 may include RF front end 288, which may operate in communication with one or more antennas 265 and transceiver 202 for receiving and transmitting radio transmissions, for example, wireless communications transmitted by at least one BS 105 or wireless transmissions transmitted by UE 110. RF front end 288 may be coupled with one or more antennas 265 and may include one or more low-noise amplifiers (LNAs) 290, one or more switches 292, one or more power amplifiers (PAs) 298, and one or more filters 296 for transmitting and receiving RF signals.

In an aspect, LNA 290 may amplify a received signal at a desired output level. In an aspect, each LNA 290 may have a specified minimum and maximum gain values. In an aspect, RF front end 288 may use one or more switches 292 to select a particular LNA 290 and the specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and the specified gain value based on a desired gain value for a particular application.

Also, for example, one or more filters 296 may be used by RF front end 288 to filter a received signal to obtain an input RF signal. Similarly, in an aspect, for example, a respective filter 296 may be used to filter an output from a respective PA 298 to produce an output signal for transmission. In an aspect, each filter 296 may be coupled with a specific LNA 290 and/or PA 298. In an aspect, RF front end 288 may use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 110 may communicate with, for example, one or more BS 105 or one or more cells associated with one or more BS 105. In an aspect, for example, the modem 220 may configure transceiver 202 to operate at a specified frequency and power level based on the UE configuration of the UE 110 and the communication protocol used by the modem 220.

In an aspect, the modem 220 may be a multiband-multimode modem, which may process digital data and communicate with transceiver 202 such that the digital data is sent and received using transceiver 202. In an aspect, the modem 220 may be multiband and be configured to support multiple frequency bands for a specific communications protocol. In an aspect, the modem 220 may be multimode and be configured to support multiple operating networks and communications protocols. In an aspect, the modem 220 may control one or more components of UE 110 (e.g., RF front end 288, transceiver 202) to enable transmission and/or reception of signals from the network based on a specified modem configuration. In an aspect, the modem configuration may be based on the mode of the modem and the frequency band in use. In another aspect, the modem configuration may be based on UE configuration information associated with UE 110 as provided by the network.

Figure 3:
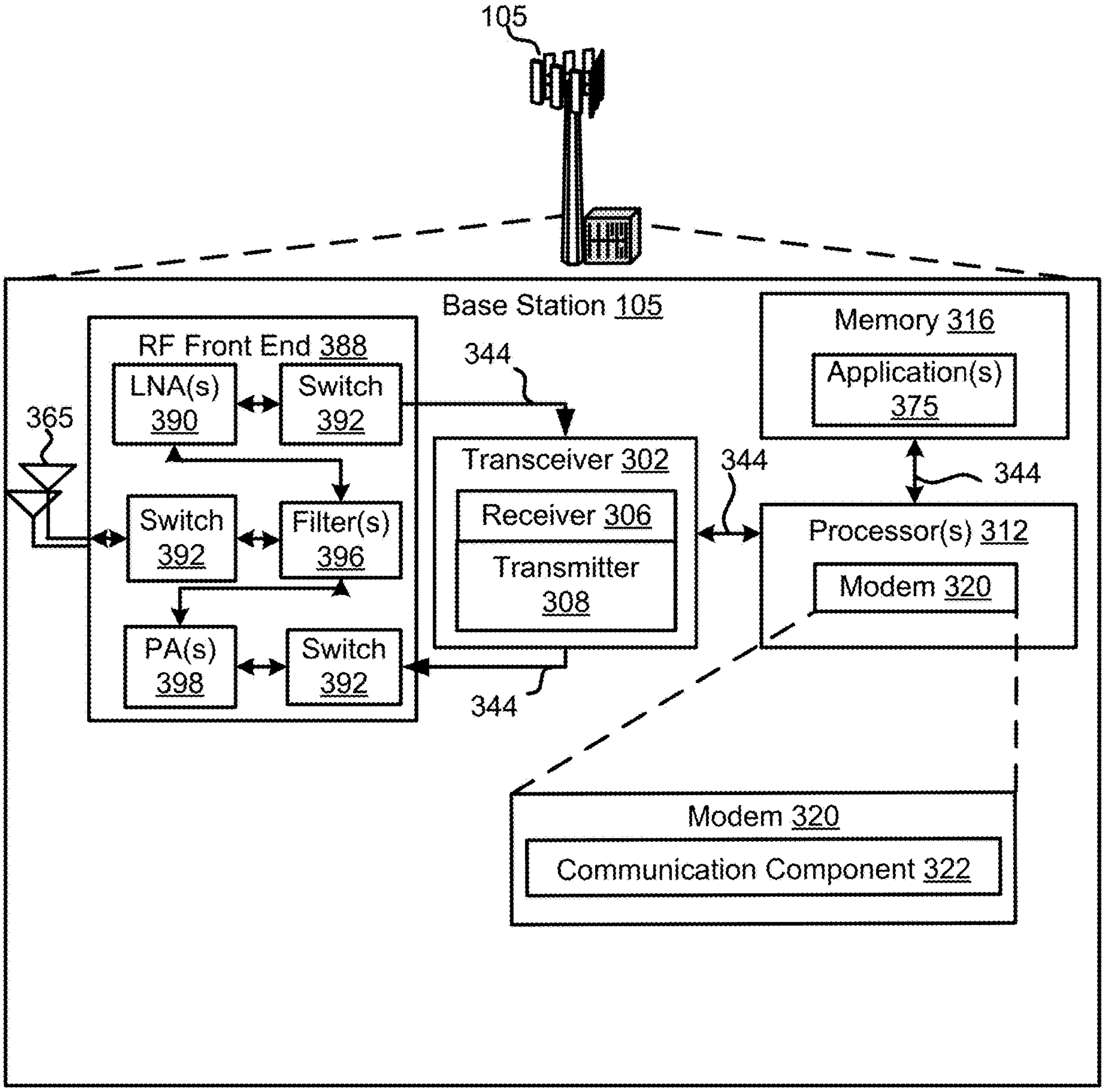
FIG. 3 is a schematic diagram of an example of a base station.

Referring to FIG. 3, one example of an implementation of the BS 105 may include a modem 320 with a communication component 322 configured to transmit data. The communication component 322 and/or the modem 320 the BS 105 may be configured to communicate with the UE 110 via a cellular network, a Wi-Fi network, or other wireless and wired networks.

In some implementations, the BS 105 may include a variety of components, including components such as one or more processors 312 and memory 316 and transceiver 302 in communication via one or more buses 344, which may operate in conjunction with the modem 320 and the communication component 322 to enable one or more of the functions described herein related to communicating with the UE 110. Further, the one or more processors 312, modem 320, memory 316, transceiver 302, RF front end 388 and one or more antennas 365, may be configured to support voice and/or data calls (simultaneously or non-simultaneously) in one or more radio access technologies.

In an aspect, the one or more processors 312 may include the modem 320 that uses one or more modem processors. The various functions related to the communication component 322 may be included in the modem 320 and/or processors 312 and, in an aspect, may be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiving device processor, or a transceiver processor associated with transceiver 302. Additionally, the modem 320 may configure the BS 105 and processors 312. In other aspects, some of the features of the one or more processors 312 and/or the modem 320 associated with the communication component 322 may be performed by transceiver 302.

Also, memory 316 may be configured to store data used herein and/or local versions of applications 375 or the communication component 322, the determination component, and/or one or more subcomponents of the communication component 322 or the determination component being executed by at least one processor 312. Memory 316 may include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, memory 316 may be a non-transitory computer-readable storage medium that stores one or more computer-executable codes defining the communication component 322, the determination component, and/or one or more of its subcomponents, and/or data associated therewith, when the BS 105 is operating at least one processor 312 to execute the communication component 322, the determination component, and/or one or more of the subcomponents.

Transceiver 302 may include at least one receiver 306 and at least one transmitter 308. The at least one receiver 306 may include hardware, firmware, and/or software code executable by a processor for receiving data, the code comprising instructions and being stored in a memory (e.g., computer-readable medium). The receiver 306 may be, for example, a RF receiving device. In an aspect, receiver 306 may receive signals transmitted by the UE 110. Transmitter 308 may include hardware, firmware, and/or software code executable by a processor for transmitting data, the code comprising instructions and being stored in a memory (e.g., computer-readable medium). A suitable example of transmitter 308 may including, but is not limited to, an RF transmitter.

Moreover, in an aspect, the BS 105 may include RF front end 388, which may operate in communication with one or more antennas 365 and transceiver 302 for receiving and transmitting radio transmissions, for example, wireless communications transmitted by other BS 105 or wireless transmissions transmitted by UE 110. RF front end 388 may be coupled with one or more antennas 365 and may include one or more low-noise amplifiers (LNAs) 390, one or more switches 392, one or more power amplifiers (PAs) 398, and one or more filters 396 for transmitting and receiving RF signals.

In an aspect, LNA 390 may amplify a received signal at a desired output level. In an aspect, each LNA 390 may have a specified minimum and maximum gain values. In an aspect, RF front end 388 may use one or more switches 392 to select a particular LNA 390 and the specified gain value based on a desired gain value for a particular application.

Further, for example, one or more PA(s) 398 may be used by RF front end 388 to amplify a signal for an RF output at a desired output power level. In an aspect, each PA 398 may have specified minimum and maximum gain values. In an aspect, RF front end 388 may use one or more switches 392 to select a particular PA 398 and the specified gain value based on a desired gain value for a particular application.

Also, for example, one or more filters 396 may be used by RF front end 388 to filter a received signal to obtain an input RF signal. Similarly, in an aspect, for example, a respective filter 396 may be used to filter an output from a respective PA 398 to produce an output signal for transmission. In an aspect, each filter 396 may be coupled with a specific LNA 390 and/or PA 398. In an aspect, RF front end 388 may use one or more switches 392 to select a transmit or receive path using a specified filter 396, LNA 390, and/or PA 398, based on a configuration as specified by transceiver 302 and/or processor 312.

As such, transceiver 302 may be configured to transmit and receive wireless signals through one or more antennas 365 via RF front end 388. In an aspect, transceiver may be tuned to operate at specified frequencies such that BS 105 may communicate with, for example, the UE 110 or one or more cells associated with one or more BS 105. In an aspect, for example, the modem 320 may configure transceiver 302 to operate at a specified frequency and power level based on the base station configuration of the BS 105 and the communication protocol used by the modem 320.

In an aspect, the modem 320 may be a multiband-multimode modem, which may process digital data and communicate with transceiver 302 such that the digital data is sent and received using transceiver 302. In an aspect, the modem 320 may be multiband and be configured to support multiple frequency bands for a specific communications protocol. In an aspect, the modem 320 may be multimode and be configured to support multiple operating networks and communications protocols. In an aspect, the modem 320 may control one or more components of the BS 105 (e.g., RF front end 388, transceiver 302) to enable transmission and/or reception of signals from the network based on a specified modem configuration. In an aspect, the modem configuration may be based on the mode of the modem and the frequency band in use. In another aspect, the modem configuration may be based on base station configuration associated with the BS 105.

Figure 4:
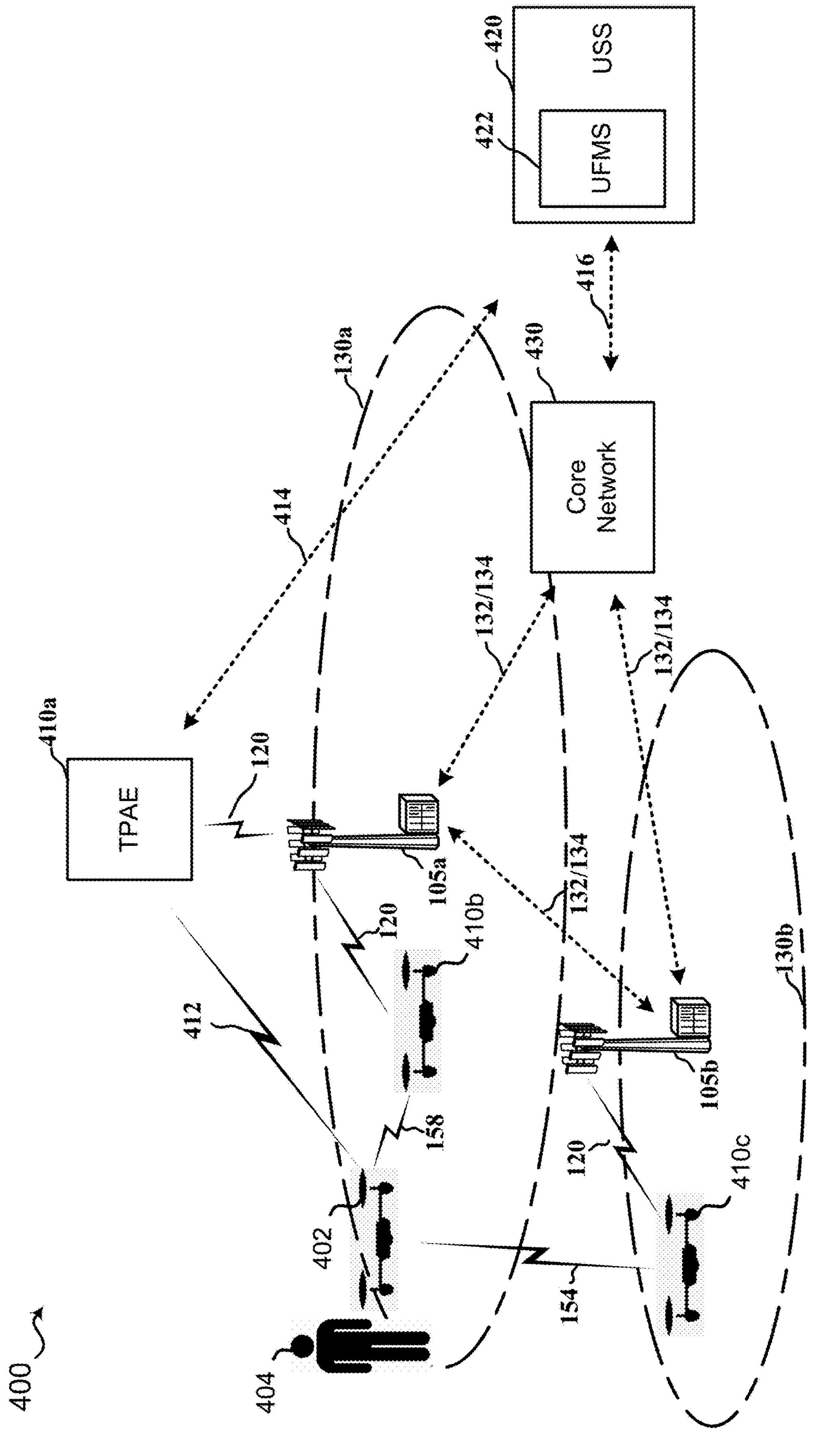
FIG. 4 is a schematic diagram of an example of an environment for managing UAVs.

Turning to FIG. 4, in an implementation, an example of an environment 400 for managing UAVs may include a mobile device 402. The mobile device 402 may include, be part of, or the same as the UE 110. The mobile device 402 may be an UAV, an unmanned aerial system (UAS), a drone, or other apparatuses controllable by a remote operator. The mobile device 402 may be operated by an operator 404 (e.g., a human operator. a machine operator or an artificial intelligence operator). The environment 400 may include a first receiver 410*a*, a second receiver 410*b*, and a third receiver 410*c*. The first receiver 410*a* may be a third-party authorized entity (TPAE, such as a police detector, civil/governmental detectors, regulatory agencies, etc.). The second receiver 410*b* and the third receiver 410*c* may be mobile devices such as UAVs. Other types of receivers are possible. The mobile device 402 may communicate with the first receiver 410*a* via wireless communication links 412 such as Bluetooth, Wi-Fi, cellular device-to-device link or other wireless communication links. The mobile device 402 may communicate with the second receiver 410*b* via the D2D communication link 158 such as Bluetooth, Wi-Fi, cellular device-to-device link or other wireless communication links. The mobile device 402 may communicate with the third receiver 410*c* via the communication links 154 such as Bluetooth, Wi-Fi, cellular device-to-device link or other wireless communication links. Other communication links may be used for communication.

In certain implementations, the environment 400 may include a first BS 105*a* having a first coverage area 130*a* and a second BS 105*b* having a second coverage area 130*b*. The environment 400 may include a core network 430, such as the EPC 160 or 5GC 190 in FIG. 1. The environment 400 may include a UAV service supplier (USS) 420. The USS 420 may optionally include a UAV flight management system (UFMS) 422. In some optional implementations, the UFMS 422 may be implemented in the core network 430. In other optional implementations, the UFMS 422 may be implemented in a stand-alone server separate from the UFMS 422. The USS 420 and/or the UFMS 422 may communicate with the first receiver 410*a* via communication link 414 (e.g., WiFi, long-range radio, cellular link, fiber optics, etc.), or via the core network 430. The USS 420 and/or the UFMS 422 may communicate with the core network 430 via communication interface 416 (e.g., 5GC 190 Network Exposure Function, EPC 160 Service Capability Exposure Function, 3GPP Rx interface, etc.).

In an implementation of the present disclosure, the mobile device 402 may include a remote identification (ID). The remote ID may include one or more information such as UAV ID (e.g., serial number, registration number, or UAV traffic management unique ID, etc.), UAV type, timestamp, timestamp accuracy, operational status, operation description, latitude, longitude, geodetic altitude, height above takeoff, pressure altitude of position, vertical accuracy, horizontal accuracy, speed (north/south), speed (cast/west), vertical speed, operator latitude, operator longitude, etc. The remote ID may be dynamically updated during operation of the mobile device 402. The mobile device 402 may obtain some or all the information (e.g., the UAV ID) in the remote ID from the USS 420 and/or the UFMS 422 via the cellular network (e.g., the first BS 105*a*, the second BS 105*b*, etc.).

In some implementations, the remote ID may include a network remote ID (NRID) and a broadcast remote ID (BRID). The NRID and/or the BRID may include some or all of the information of the remote ID. In one example, the BRID may include the UAV ID and location information.

In one implementation, a cryptographic hash/digest of the BRID is identical to the UAV ID or an index to the UAV ID.

In one aspect of the present disclosure, the mobile device 402 may broadcast the BRID to one or more of the first receiver 410*a*, the second receiver 410*b*, and/or the third receiver 410*c*. In order to enable the first receiver 410*a*, the second receiver 410*b*, and/or the third receiver 410*c* to authenticate the BRID, the mobile device 402 may transmit (e.g., unicast, multicast, or broadcast) a certificate. The certificate may be a certificate of the mobile device 402, a certificate from a certificate authority that assigned the certificate of the mobile device 402, or a trust chain file indicating one or more hierarchies of certificates, each up to a root certificate or other designated authority. The mobile device 402 may partition the certificate into n parts, and may transmit the n parts of the certificate in n frames. For example, the mobile device 402 may partition the certificate into 20 parts (n=20). The mobile device 402 may embed the 20 certificate partitions/segments into 20 frames, and sequentially transmit the 20 frames to one or more of the first receiver 410*a*, the second receiver 410*b*, and/or the third receiver 410*c*. For example, frame 1 may include part 1 of the certificate, frame 2 may include part 2 of the certificate, and so forth. Once a receiver (e.g., the first receiver, the second receiver, and/or third receiver) receives all of the frames (e.g., 20 frames), the receiver (e.g., . . . ) may concatenate the parts of the certificate (e.g., 20 parts of the 20 frames) to generate or form the certificate (e.g., certificate of mobile device 402).

In an instance, using the certificate to authenticate the BRID may allow the receivers 410 to simultaneously verify the authenticity of the mobile device 402.

In some aspects, the mobile device 402 may indicate to the receivers 410*a-c* the number of parts (or frames) for the certificate. For example, the mobile device 402 may partition the certificate into 50 parts and embed the 50 parts into 50 frames. The mobile device 402 may indicate in the first frame (containing the first part of the certificate) that there are 50 parts of the certificate that will be transmitted. In response, the receivers 410*a-c* may assemble the certificate after receiving the 50 parts in 50 frames.

In another aspect, the mobile device 402 may indicate to the receivers 410*a-c* the last frame carrying the last part of the certificate. For example, the mobile device 402 may partition the certificate into 15 parts and embed the 15 parts into 15 frames. The mobile device 402 may indicate in the $15^{th}$ frame that it is the last frame carrying the parts of the certificate. In response, the receivers 410*a-c* may assemble the certificate after receiving the $15^{th}$ frame (having the $15^{th}$ or last part).

In some aspects, the frames carrying the parts of the certificate may be labeled as a certificate frame.

In certain aspects, the number of frames used for transmitting the parts of the certificate (i.e., segments) may be dynamically determined based on factors such as weather conditions, traffic, regulatory requirements, technology used for transfer, etc.

In some implementations, after the receivers 410*a-c* concatenates the certificate from the parts of the certificate, the receivers 410*a-c* may use the certificate to authenticate the BRID and/or other messages transmitted by the mobile device 402.

In certain aspects, the mobile device 402 may transmit the frames carrying the parts of the certificate at a certain periodicity. Examples of the periodicity may include 50 millisecond (ms), 100 ms, 500 ms, 1 second(s), 5 s, 10 s, 50 s, 100 s, or other durations. The periodicity may be determined by various methods described below.

In one aspect of the present disclosure, the mobile device 402 may receive a security profile (e.g., IEEE 1609.2 Security Profile). The mobile device 402 may receive the security profile during installation, programming, setup, initialization, or registration of the mobile device 402. The security profile may indicate the periodicity to transmit the frames carrying the parts of the certificate.

In another aspect of the present disclosure, the mobile device 402 may receive the periodicity value when connected to the first BS 105*a*, the second BS 105*b*, the UFMS 422, and/or the USS 420. For example, when the USS 420 and/or the UFMS 422 provides the UAV ID to the mobile device 402, the USS 420 and/or the UFMS 422 may transmit the periodicity to the mobile device 402. In other examples, the periodicity may be embedded in the UAV ID when the USS 420 and/or the UFMS 422 provides the UAV ID to the mobile device 402.

In a different aspect, the first BS 105*a* serving the mobile device 402 may transmit the periodicity to the mobile device 402 via a radio resource configuration (RRC) message or a system information broadcast (SIB) message. The periodicity transmitted may be a value (e.g., 1 s, 2 s, 5 s, 10 s, 20 s, 50 s, 100 s, etc.) or one of a set of predefined indices (e.g., 0-never, 1-5 s, 2-10 s, 3-20, etc.).

In some aspects of the present disclosure, the first BS 105*a* serving the mobile device 402 may update the periodicity of the mobile device 402 dynamically via a RRC message. The first BS 105*a* may transmit a RRC message to the mobile device 402 to change the periodicity to transmit the frames carrying the parts of the certificate from, e.g., 10 s to 15 s.

In one implementation, the periodicity may be a function of the flight plan of the mobile device 402, geographical areas along the light plan, local/regional/national policy, traffic density, topographical interference, or other factors relevant to the operation of the mobile device 402.

In some implementations, the periodicity may be adaptively based on detected environmental factors such as RF interference from other UAV traffic, weather-related attenuation, excessive requests for certificate, etc. In certain implementations, the periodicity may be determined based on the received signal strength indication (RSSI), the radio frequency, one or more network or link quality of service (QOS) parameters, or other factors associated with the quality of the communication channel.

In an aspect of the present disclosure, the receivers 410*a-c* may obtain the certificate from sources other than the mobile device 402. In a first example, the USS 420 and/or the UFMS 422 may provide the certificate to the core network 430. The core network 430 may determine the geographical location of the mobile device 402 based on the location information (e.g., latitude, longitude, altitude, etc.) in the remote ID, the BRID, or the NRID. The core network 430 may determine the one or more coverage areas and corresponding base stations associated with the geographical location, such as the first BS 105*a* and the first coverage area 130*a*. The core network 430 may provide the certificate to the first BS 105*a* after determining that the mobile device 402 is within the first coverage area 130*a*. The mobile device 402 may broadcast the BRID. After the mobile device 402 broadcasts the BRID, the second receiver 410*b* may receive the BRID from the mobile device 402. The second receiver 410*b* may obtain information, such as the UAV ID of the mobile device 402, from the BRID. The second receiver 410*b* may transmit a certificate request, including the UAV ID, to the first BS 105*a* (the serving base station for the second receiver 410*b*). In response, the first BS 105*a* may transmit a certificate response including the certificate (received earlier from the core network 430) to the second receiver 410*b*. The second receiver 410*b* may use the certificate to authenticate the BRID from the mobile device 402.

In a second example, the mobile device 402 may broadcast the BRID. After the mobile device 402 broadcasts the BRID, the second receiver 410*b* may receive the BRID from the mobile device 402. The second receiver 410*b* may obtain information, such as the UAV ID of the mobile device 402, from the BRID. The second receiver 410*b* may transmit a certificate request, including the UAV ID, to the first BS 105*a* (the serving base station for the second receiver 410*b*). In response, the first BS 105*a* may transmit a certificate retrieval message (including the UAV ID of the mobile device 402) to the USS 420 and/or the UFMS 422 (e.g., via the core network 430) to request the certificate. The USS 420 and/or the UFMS 422 may transmit the certificate associated with the UAV ID of the mobile device 402 in a certificate delivery message to the first BS 105*a*. The first BS 105*a*, after receiving the certificate deliver message, may transmit a certificate response including the certificate to the second receiver 410*b* in response to the certificate request to the second receiver 410*b*. The second receiver 410*b* may use the certificate to authenticate the BRID from the mobile device 402.

In a third example, the mobile device 402 may broadcast the BRID. After the mobile device 402 broadcasts the BRID, the second receiver 410*b* may receive the BRID from the mobile device 402. The second receiver 410*b* may obtain information, such as the UAV ID of the mobile device 402, from the BRID. The second receiver 410*b* may transmit a certificate request, including the UAV ID, to the USS 420 and/or the UFMS 422 (e.g., via the first BS 105*a* and/or the core network 430) by identifying the USS 420 and/or the UFMS 422 using the UAV ID (e.g. the UAV ID may be in the format of an FQDN and the receiver 410*b* uses DNS to retrieve the address of the USS and/or UFMS). The USS 420 and/or the UFMS 422, in response to receiving the certificate request, may transmit a certificate response including the certificate associated with the UAV ID to the second receiver 410*b* (e.g., via the core network 430 and/or the first BS 105*a*). The second receiver 410*b* may use the certificate to authenticate the BRID from the mobile device 402.

In a fourth example, the USS 420 and/or the UFMS 422 may provide the certificate to the core network 430. The core network 430 may determine the geographical location of the mobile device 402 based on the location information (e.g., latitude, longitude, altitude, etc.) in the remote ID, the BRID, and/or the NRID. The core network 430 may determine the one or more coverage areas and corresponding base stations associated with the geographical location, such as the first BS 105*a* and the first coverage area 130*a*. The core network 430 may provide the certificate to the first BS 105*a* after determining that the mobile device 402 is within the first coverage area 130*a*. Upon receiving the certificate, the first BS 105*a* may broadcast the certificate in the first coverage area 130*a*. The second receiver 410*b* may receive the broadcasted certificate. The mobile device 402 may broadcast the BRID. After the mobile device 402 broadcasts the BRID, the second receiver 410*b* may receive the BRID from the mobile device 402. The second receiver 410*b* may use the certificate to authenticate the BRID from the mobile device 402. The first BS 105*a* and the second BS 105*b* may broadcast the received certificates using Cellular Broadcasting System with an indication of BRID Certificates, the Commercial Mobile Alert System (CMAS) with an indication of BRID Certificates, or using Multimedia Broadcast/Multicast System using a common or dedicated channel for BRID Certificates to which all receivers subscribe to receive the BRID certificates.

In a fifth example, the first BS 105*a* may receive the certificate from the mobile device 402, the core network 430, the UFMS 422, and/or the USS 420. The first BS 105*a* may receive a flight/travel plan of the mobile device 402 from the core network 430, the UFMS 422, and/or the USS 420. Based on the flight plan, the first BS 105*a* may determine a geographical area that the mobile device 402 will enter. The first BS 105*a* may identify a coverage area, such as the second coverage area 130*b* of the second BS 105*b*, associated with the geographical area that the mobile device 402 will enter. In response, the first BS 105*a* may identify the second BS 105*b* being associated with the second coverage area 130*b* and transmit the certificate to the second BS 105*b* (for broadcasting to receivers in the second coverage area 130*b*) before the mobile device 402 enters the second coverage area 130*b*.

In some aspects of the present disclosure, the receivers 410 may use the certificate to authenticate an arbitrary message transmitted by the mobile device 402. Once authenticated, the receivers 410 is able to verify the authenticity and/or integrity of the arbitrary message of the mobile device 402. In another example, the mobile device 402 may use an arbitrary message as the BRID.

Figure 5:
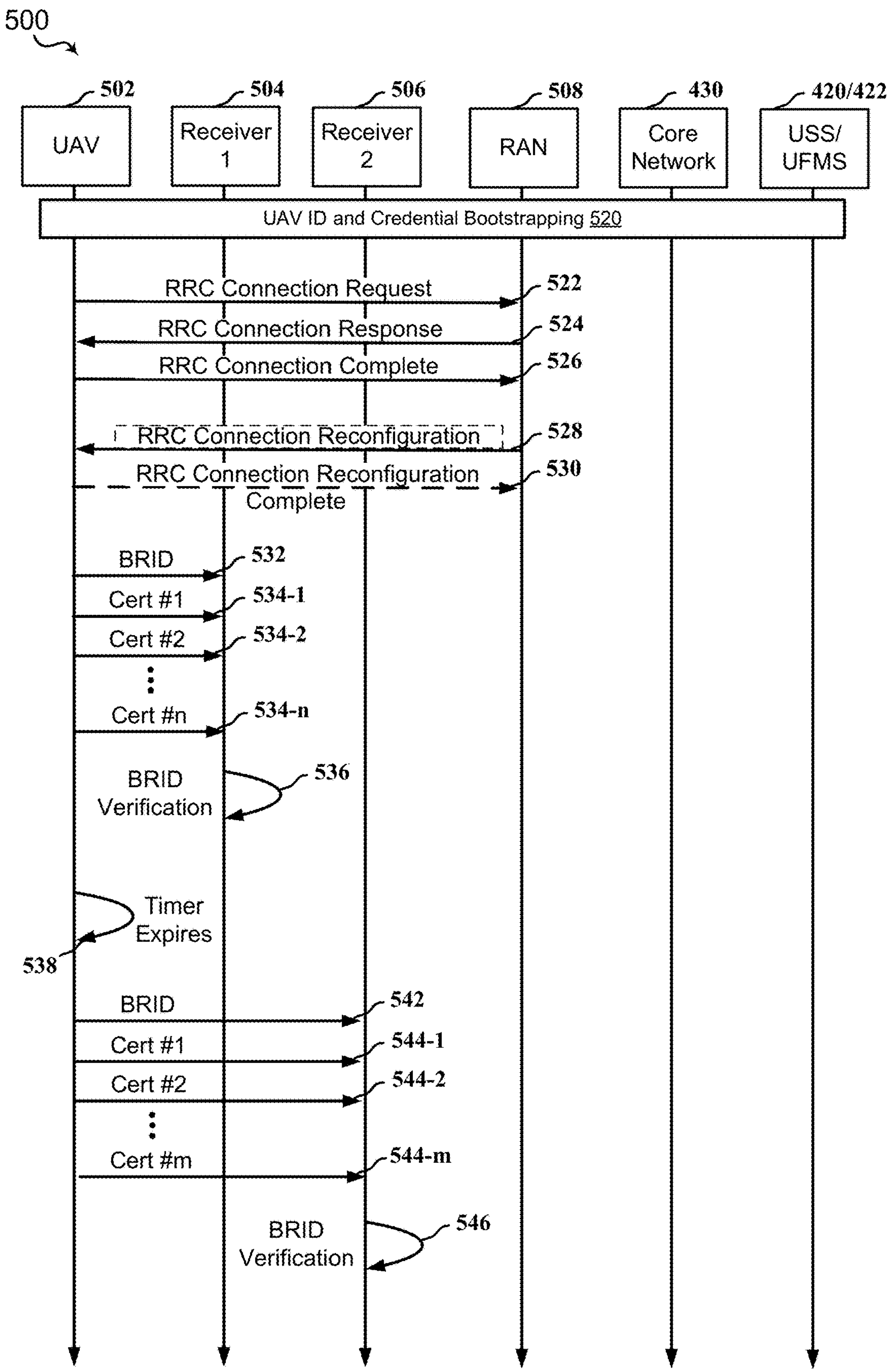
FIG. 5 is a sequence diagram of an example of a process of distributing certificates by a UAV.

Turning to FIG. 5, in some implementation, an example of a sequence diagram 500 may include a UAV 502, a first receiver 504, a second receiver 506, a radio access network (RAN) 508, the core network 430, the UFMS 422, and the USS 420. The first receiver 504 and/or the second receiver 506 may be UAVs, mobile devices, UEs, TPAEs, base stations, controllers, or other devices. At 520, the UAV 502 may be configured by obtaining the UAV ID and perform credential bootstrapping (e.g., security certificate). At 522, the UAV 502 may transmit a RRC connection request to the RAN 508. At 524, the RAN 508 may transmit a RRC connection response to the UAV 502 with parameters for establishing the wireless communication link between the RAN 508 and the UAV 502. At 526, the UAV 502 may transmit a RRC connection complete message to the RAN 508. At 528, the RAN 508 may optionally transmit a RRC connection reconfiguration message to the UAV 502. The reconfiguration may change connection and/or operation parameters of the UAV 502, such as the periodicity to transmit parts of the certificate, as an example. At 530, the UAV 502 may optionally transmit a RRC connection reconfiguration complete message to the RAN 508 in response to completing the reconfiguration.

In some implementation, at 532, the UAV 502 may broadcast the BRID, which is received by the first receiver 504. The UAV 502 may partition the certificate into n segments (e.g., 25 segments). The UAV 502 may embed the n segments into n frames. In optional implementations, the UAV 502 may label the n frames to indicate that the n frames carry segments of the certificate. At 534-1, the UAV 502 may transmit the first frame carrying the first segment of the certificate. At 534-2, the UAV 502 may transmit the second frame carrying the second segment of the certificate, and so forth and so on. At **534-*n*, the UAV 502 may transmit the $n^{th}$ frame carrying the last segment of the certificate. The UAV 502 may transmit each frame of the n frames carrying the segments of the certificate at a predetermined periodicity. For example, the periodicity may be signaled by the USS 420 and/or the UFMS 422 at step 520 during the bootstrapping process. Alternatively, the periodicity signaled by the RAN 508 at step 524 or 528 using a RRC configuration/reconfiguration message. The periodicity may also be stored internally (e.g., in the memory, hard-coded, etc.) in the UAV 502 prior to step 520**.

In optional implementations, the first frame may include a segment indicator indicating that the certificate includes n segments. The segment indicator may indicate to a receiving device, such as the first receiver 504, that there are n frames (and n segments of the certificate) to be transmitted by the UAV 502.

In another optional implementation, the $n^{th}$ frame may include a termination indicator indicating that the $n^{th}$ frame is carrying the last segment of the certificate by the UAV 502.

In one optional implementation, the UAV 502 may assign sequential numbers to the n frames corresponding to the order of the segments of the certificate. A frame carrying the first segment of the certificate may be assigned "1." A frame carrying the second segment of the certificate may be assigned "2," etc.

In an aspect of the present disclosure, the UAV 502 may partition the certificate into segment groups. The UAV 502 may embed each of the segment groups (equal in number or not equal in number) sequentially into a corresponding frame for transmission. For example, the UAV 502 may partition the certificate into 50 segments. The UAV 502 may group the 50 segments of the certificate into 5 segment groups of 10 (e.g., group 1-segment #1-10, group 2-segment #11-20, and so forth and so on). The UAV 502 may embed the first segment group into a first frame, the second segment group into a second frame, and so forth. The UAV 502 may sequentially transmit the five frames carrying the five segment groups. In some implementations, the groups may have the same number of segments or different number of segments.

At 536, the first receiver 504 may validate the BRID by authenticating the BRID using the concatenated certificate (as described above).

In alternative implementations, each segment of the certificate may be associated with an identifier. For example, the UAV 502 may partition the certificate into 30 segments. The UAV 502 may label the first segment with a "1," the second segment with a "2," . . . and the thirtieth segment with a "30." If the first receiver 504 fails to receive some of the segments (e.g., the seventeenth segment, labeled with the identifier "17"), the first receiver 504 may send a request to the UAV 502 to retransmit the seventeenth segment using the identifier.

At 538, the UAV 502 may wait until a broadcasting timer expires. The broadcasting timer may indicate an interval the UAV 502 waits between broadcasting two BRIDs. The broadcasting timer may last 1 s, 5 s, 10 s, 50 s, or other suitable intervals (e.g., depending on the operation of the UAV 502, battery power remained in the UAV 502, the operating environment, regulations, etc.)

In some implementation, at 542, the UAV 502 may broadcast the BRID, which is received by the second receiver 506. The UAV 502 may partition the certificate into m segments (e.g., 15 segments). The UAV 502 may embed the m segments into m frames. In optional implementations, the UAV 502 may label the m frames to indicate that the m frames carry segments of the certificate. At 544-1, the UAV 502 may transmit the first frame carrying the first segment of the certificate. At 544-2, the UAV 502 may transmit the second frame carrying the second segment of the certificate, and so forth and so on. At **544-*m*, the UAV 502 may transmit the $m^{th}$ frame carrying the last segment of the certificate. At 546, the second receiver 506** may validate the BRID by authenticating the BRID using the concatenated certificate (as described above).

In some instances, the number of segments the UAV 502 divides the certificate into may depend on the communication link technology, the operation of the UAV 502, battery power remained in the UAV 502, the operating environment, regulations, etc.

Turning to FIGS. 6A-E, in an implementation, an example of a sequence diagram 600 may include a UAV 602, a first receiver 604, a second receiver 606, the first BS **105*a*, the second BS 105*b*, the core network 430, the UFMS 422, and the USS 420. The first receiver 604 and/or the second receiver 606 may be UAVs, mobile devices, UEs, TPAEs, base stations, controllers, or other devices. At 620, the UAV 602 may be configured by obtaining the UAV ID and perform credential bootstrapping (e.g., security certificate). At 622, the UAV 602 may be registered and/or connected to the mobile network including the first BS 105*a* and the second BS 105*b*. At 624, the UAV 602 may register with the USS 420 and/or the UFMS 422**.

Figure 6A:
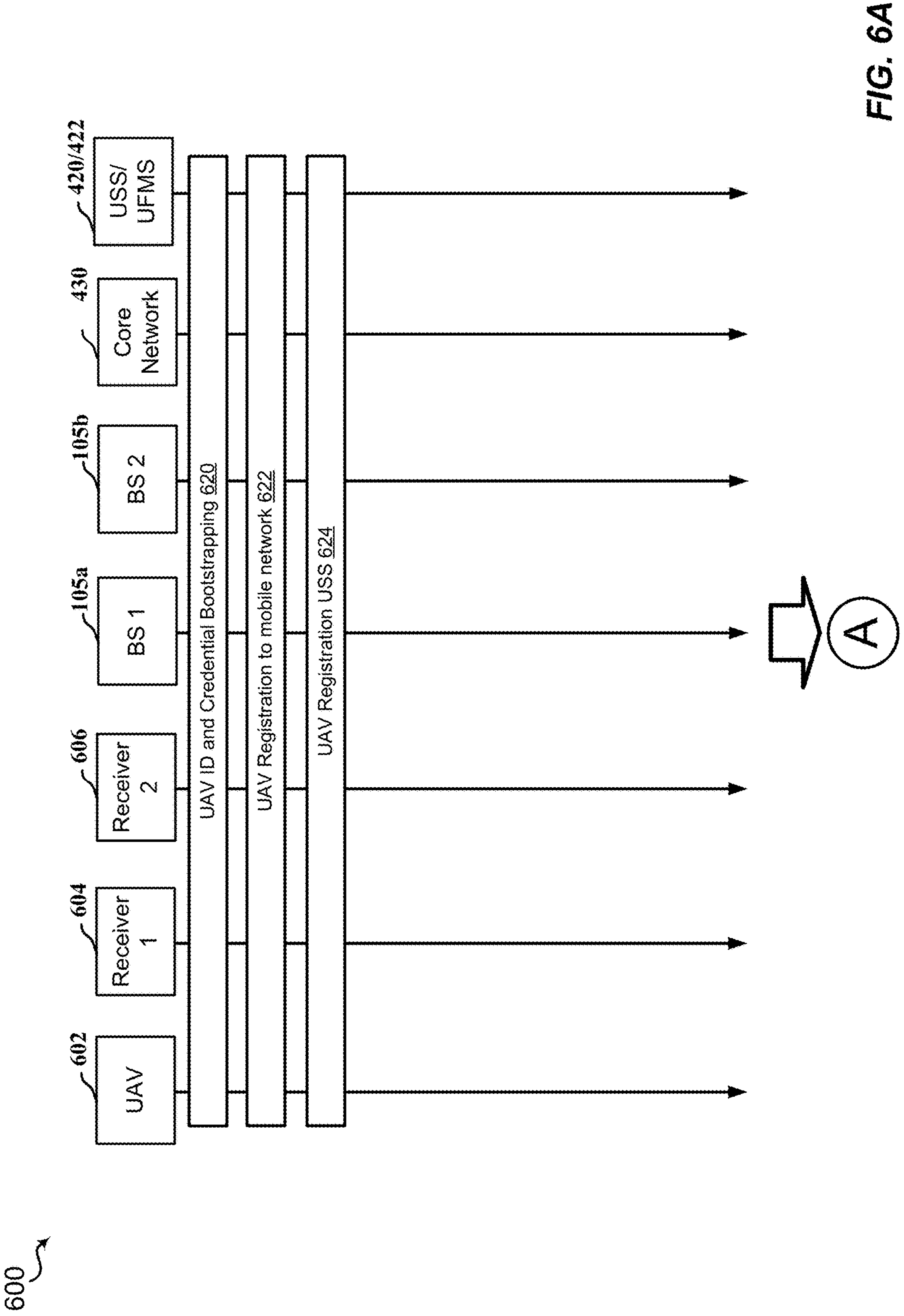
FIG. 6A is a sequence diagram of an example of a UAV initialization process into a network.
Figure 6B:
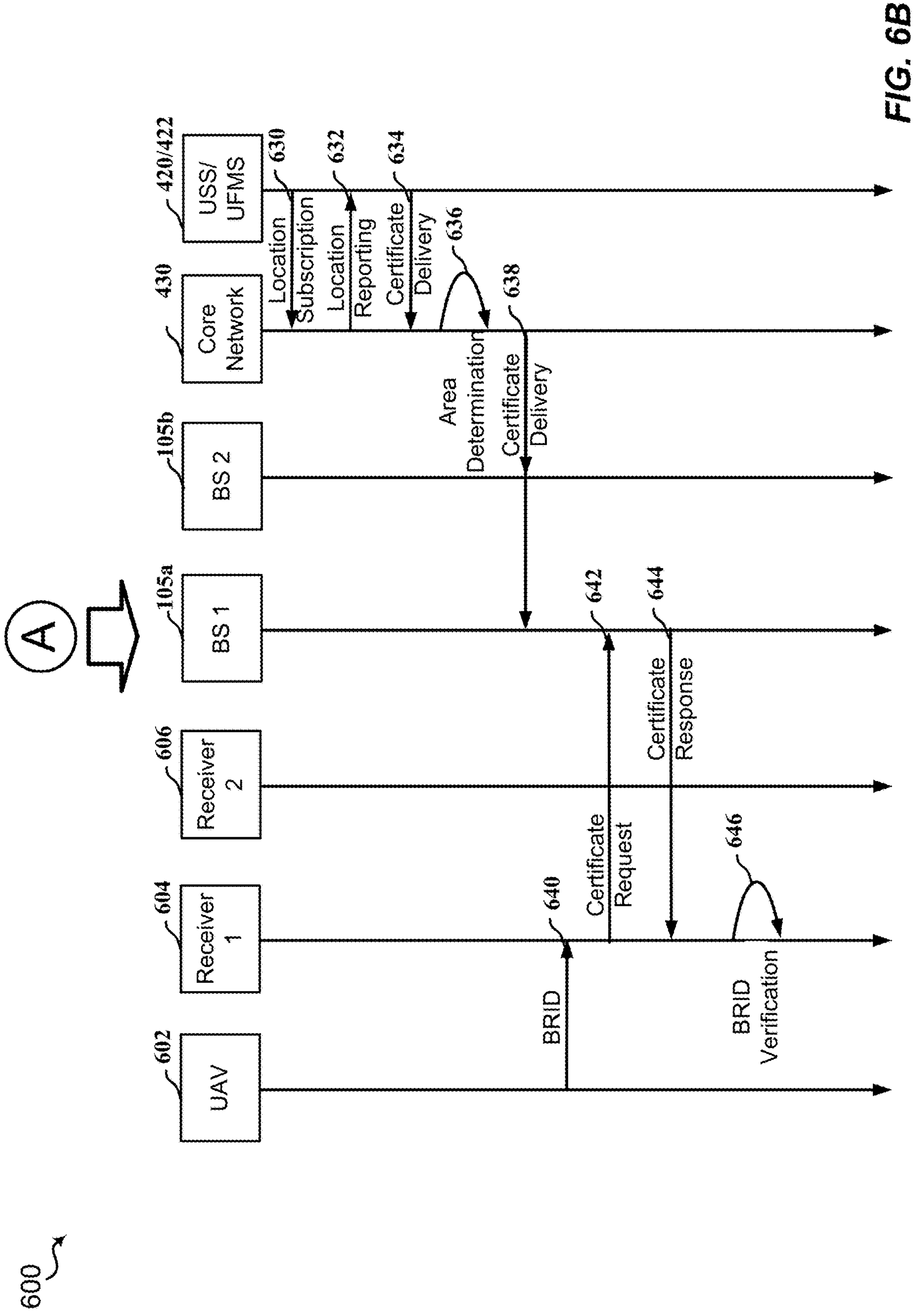
FIG. 6B is a sequence diagram of a first example of a process of distributing certificates by a base station.

Referring to FIGS. 6A and 6B, in certain implementation, at 630, the USS 420 may transmit a location subscription to the core network 430 to obtain the updated location of the UAV 602. At 632, the core network 430 may transmit a location report including the last-known location of the UAV 602 (based on the remote ID, NRID, or BRID received). In optional implementations, the USS 420 may subscribe to the UFMS 422 to obtain location information from the UFMS 422. In another instance, the USS 420 may obtain location information from the Location Service (LCS) of the communication network 100. At 634, the USS 420 and/or the UFMS 422 may transmit the certificate associated with the UAV 602 (including the UAV ID) to the core network 430. At 636, based on the location information received from the USS 420, the UFMS 422, the core network 430 may determine the geographical location of the UAV 602 based on the location information (e.g., latitude, longitude, altitude, etc.) in the location report. The core network 430 may determine the one or more coverage areas and corresponding base stations associated with the geographical location, such as the first BS **105*a* and the first coverage area 130*a*. At 638, the core network 430 may provide the certificate to the first BS 105***a* and/or the second BS 105*b* after determining that the UAV 602 is within the first coverage area 130*a*.

In some implementations, at 640, the UAV 602 may broadcast the BRID. After the UAV 602 broadcasts the BRID, the first receiver 604 may receive the BRID from the UAV 602. The first receiver 604 may obtain information, such as the UAV ID of the UAV 602, from the BRID. At 642, the first receiver 604 may transmit a certificate request, including the UAV ID, to the first BS 105*a* (the serving base station for the first receiver 604). In response, the first BS 105*a* may identify the certificate associated with the UAV ID. At 644, the first BS 105*a* may transmit a certificate response including the certificate (received earlier from the core network 430 at 638) to the first receiver 604. At 646, the first receiver 604 may use the certificate to authenticate the BRID from the UAV 602.

Figure 6C:
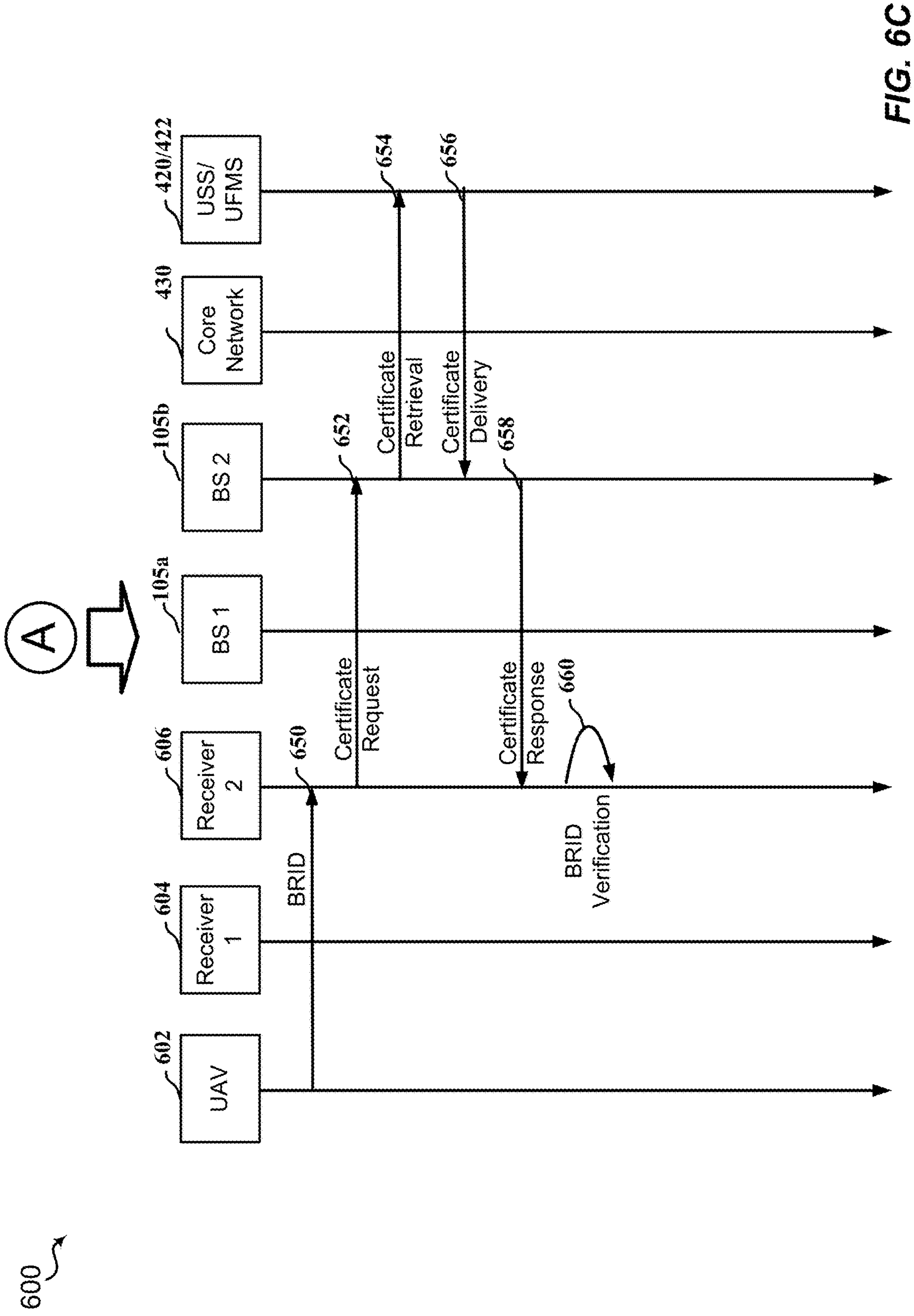
FIG. 6C is a sequence diagram of a second example of a process of distributing certificates by a base station.

Turning to FIGS. 6A and 6C, in some implementations, at 650, the UAV 602 may broadcast the BRID. After the UAV 602 broadcasts the BRID, the second receiver 606 may receive the BRID from the UAV 602. The second receiver 606 may obtain information, such as the UAV ID of the UAV 602, from the BRID. At 652, the second receiver 606 may transmit a certificate request, including the UAV ID, to the second BS 105*b* (e.g., the serving base station for the second receiver 606). In response, at 654, the second BS 105*b* may transmit a certificate retrieval message (including the UAV ID of the UAV 602) to the UFMS 422 (e.g., via the core network 430) to request the certificate. Alternatively, the BS 105*b* may transmit the certificate retrieval message to the USS 420 through the UFMS to request the certificate. At 656, the USS 420 and/or the UFMS 422 may transmit the certificate associated with the UAV ID of the UAV 602 in a certificate delivery message to the second BS 105*b*. At 658, the second BS 105*b*, after receiving the certificate deliver message, may transmit a certificate response including the certificate to the second receiver 606 in response to the certificate request to the second receiver 606. At 660, the second receiver 606 may use the certificate to authenticate the BRID from the UAV 602.

Figure 6D:
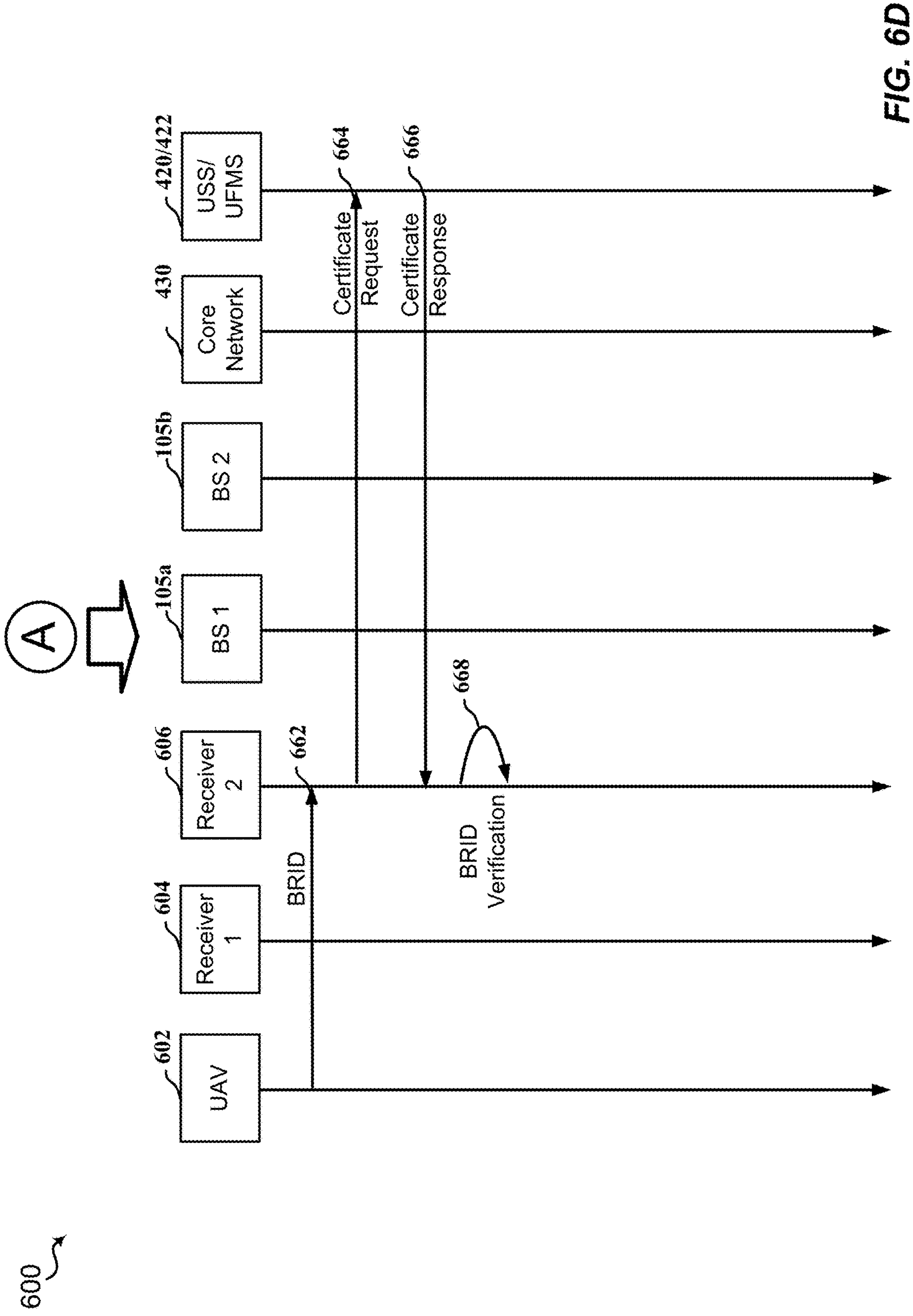
FIG. 6D is a sequence diagram of an example of a process of obtaining certificates by a receiver.

Turning to FIGS. 6A and 6D, in certain implementations, at 662, the UAV 602 may broadcast the BRID. After the UAV 602 broadcasts the BRID, the second receiver 606 may receive the BRID from the UAV 602. The second receiver 606 may obtain information, such as the UAV ID of the UAV 602, from the BRID. At 664, the second receiver 606 may transmit a certificate request, including the UAV ID, to the USS 420 and/or the UFMS 422 (e.g., via the first BS 105*a*, the second BS 105*b*, and/or the core network 430). At 666, the USS 420 and/or the UFMS 422, in response to receiving the certificate request, may transmit a certificate response including the certificate associated with the UAV ID to the second receiver 606 (e.g., via the core network 430, the first BS 105*a*, and/or the second BS 105*b*). At 668, the second receiver 606 may use the certificate to authenticate the BRID from the UAV 602.

Figure 6E:
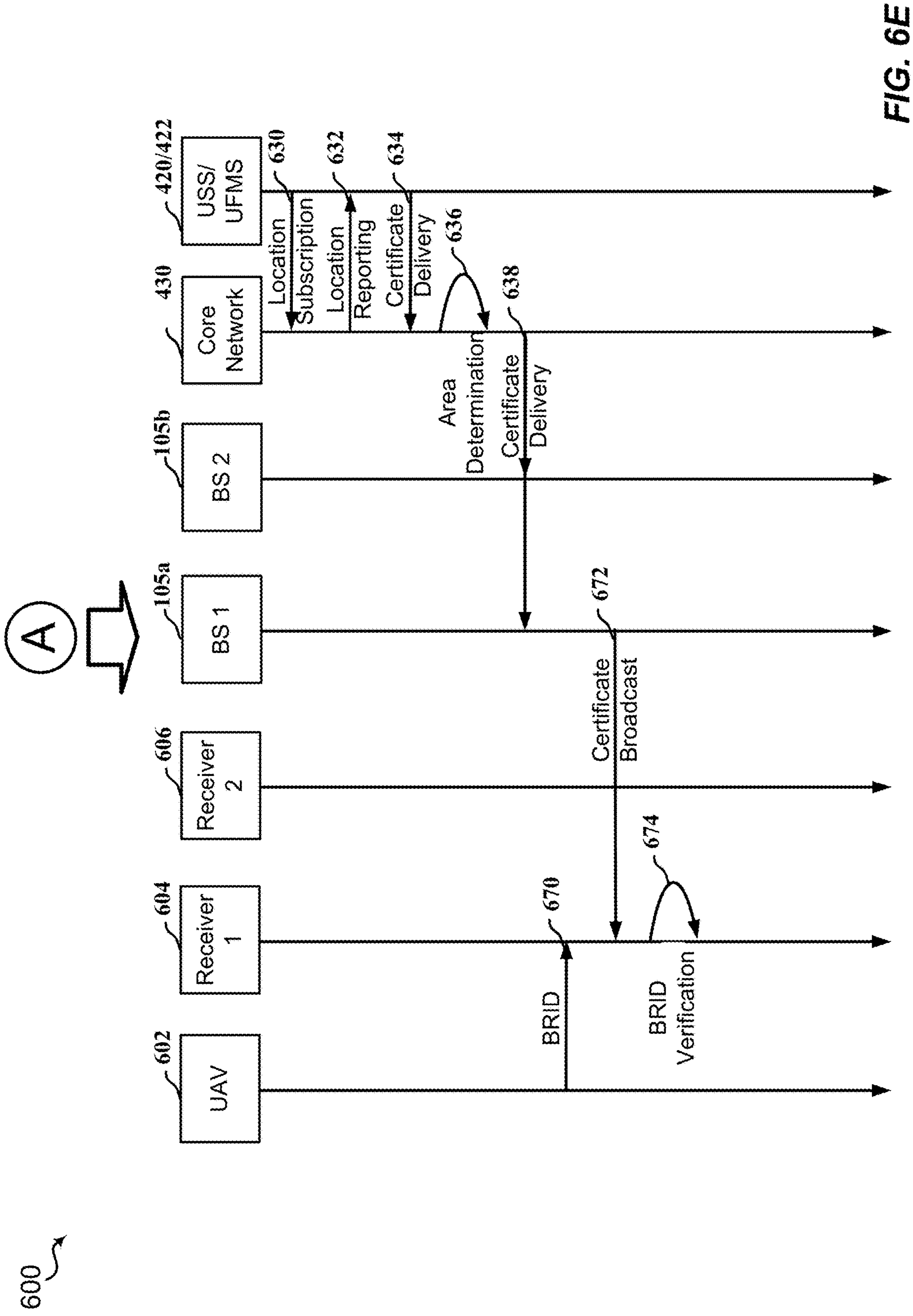
FIG. 6E is a sequence diagram of an example of a process of broadcasting certificates by a base station.

Referring to FIGS. 6A and 6E, in an implementation, at 630, the core network 430 may transmit a location subscription to the USS 420 and/or the UFMS 422 to obtain the updated location of the UAV 602. At 632, the USS 420 and/or the UFMS 422 may transmit a location report including the last-known location of the UAV 602 (based on the remote ID, NRID, or BRID received). At 634, the USS 420 and/or the UFMS 422 may transmit the certificate associated with the UAV 602 (including the UAV ID) to the core network 430. At 636, the core network 430 may determine the geographical location of the UAV 602 based on the location information (e.g., latitude, longitude, altitude, etc.) in the remote ID, the BRID, and/or the NRID. The core network 430 may determine the one or more coverage areas and corresponding base stations associated with the geographical location, such as the first BS 105*a* and the first coverage area 130*a*. At 638, the core network 430 may provide the certificate to the first BS 105*a* via a certificate delivery message after determining that the UAV 602 is within the first coverage area 130*a*. At 670, the UAV 602 may broadcast the BRID. After the UAV 602 broadcasts the BRID, the first receiver 604 may receive the BRID from the UAV 602. At 672, the first BS 105*a* may broadcast the certificate in the first coverage area 130*a* (received from the core network 430 at 638). The first receiver 604 may receive the broadcasted certificate. At 674, the first receiver 604 may use the certificate to authenticate the BRID from the UAV 602.

In one aspects of the present disclosure, a receiver requesting a certificate may store a map, directions, and/or coordinates indicating geographic locations with no or substantially no network signals. Prior to approaching the locations, the receiver may request the certificate before losing the ability to wireless acquire the certificate.

Figure 7:
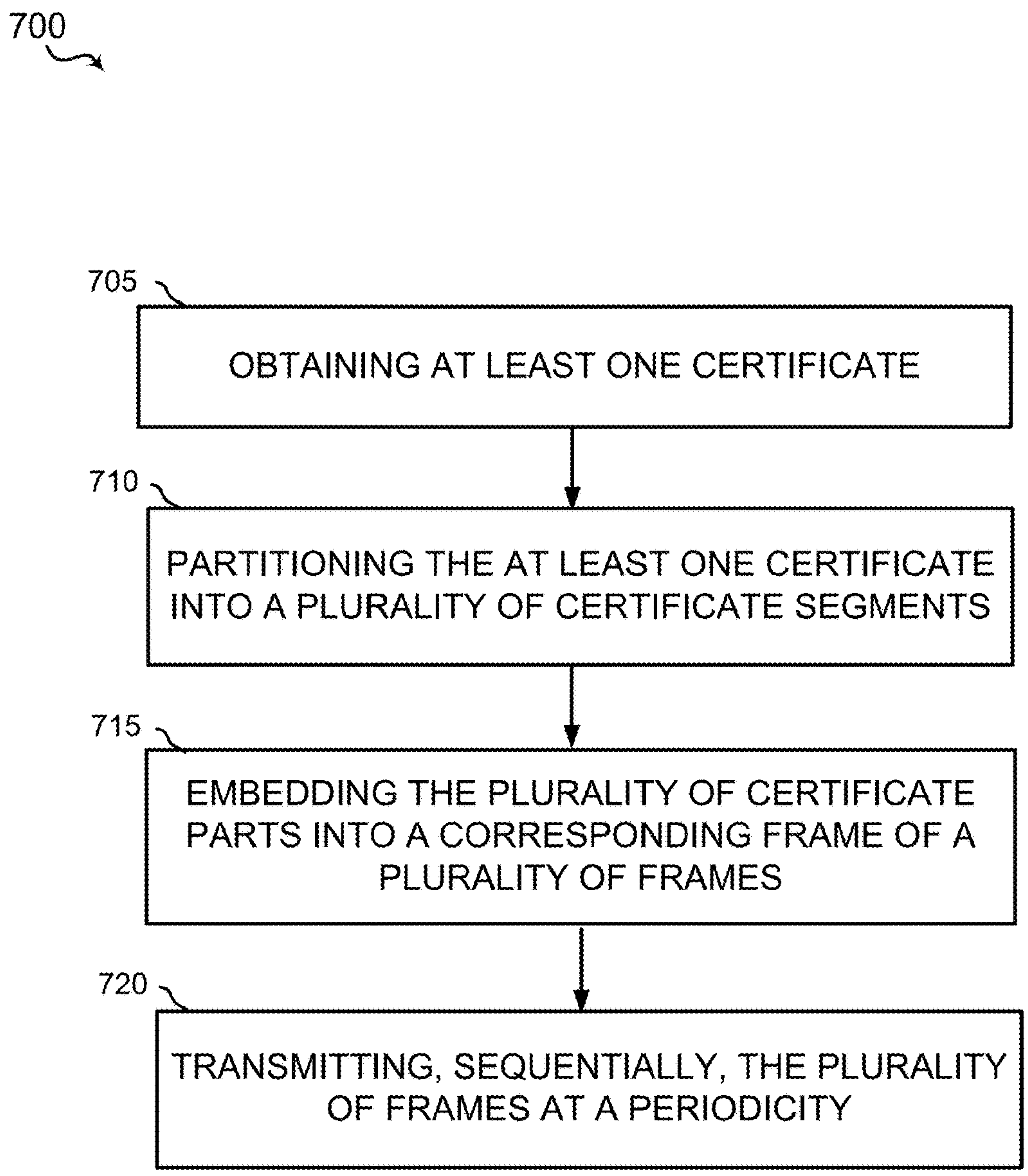
FIG. 7 is a process flow diagram of an example of a method for transmitting certificates by a mobile device.

Referring to FIG. 7, an example of a method 700 for transmitting a certificate may be performed by the one or more of the processor 212, the memory 216, the applications 275, the modem 220, the transceiver 202 and/or its subcomponents, the RF front end 288 and/or its subcomponents, the communication component 222, and/or the certificate component 224 of the UE 110 (e.g., mobile device 402, UAV 502, or UAV 602) in the wireless communication network 100.

At block 705, the method 700 may obtain at least one certificate. For example, the certificate component 224 of the UE 110 may obtain at least one certificate as described above with respect to FIGS. 4-6.

In certain implementations, the processor 212, the modem 220, the processor 212, the memory 216, the applications 275, the modem 220, and/or the certificate component 224 may be configured to and/or may define means for obtaining at least one certificate.

At block 710, the method 700 may partition the at least one certificate into a plurality of certificate segments. For example, the certificate component 224 of the UE 110 may partition the at least one certificate into a plurality of certificate segments as described above.

In certain implementations, the processor 212, the modem 220, the processor 212, the memory 216, the applications 275, the modem 220, and/or the certificate component 224 may be configured to and/or may define means for partitioning the at least one certificate into a plurality of certificate segments.

At block 715, the method 700 may embed the plurality of certificate parts into a corresponding frame of a plurality of frames. For example, the communication component 224 of the UE 110 may embed the plurality of certificate parts into a corresponding frame of a plurality of frames. The first certificate segment may be embedded into a first frame, the second certificate segment into a second frame, and so forth and so on.

In certain implementations, the processor 212, the modem 220, the processor 212, the memory 216, the applications 275, the modem 220, and/or the communication component 224 may be configured to and/or may define means for embedding the plurality of certificate parts into a corresponding frame of a plurality of frames.

At block 720, the method 700 may transmit, sequentially, the plurality of frames at a periodicity. For example, the communication component 224 of the UE 110 may transmit, sequentially, the plurality of frames at a periodicity. The communication component 222 may send the plurality of frames to the transceiver 202 or the transmitter 208. The transceiver 202 or the transmitter 208 may convert the plurality of frames to electrical signals and send to the RF front end 288. The RF front end 288 may filter and/or amplify the electrical signals. The RF front end 288 may send the electrical signals as electro-magnetic signals via the one or more antennas 265.

In certain implementations, the processor 212, the modem 220, the communication component 222, the transceiver 202, the receiver 206, the transmitter 208, the RF front end 288, and/or the subcomponents of the RF front end 288 may be configured to and/or may define means for transmitting, sequentially, the plurality of frames at a periodicity.

Alternatively or additionally, the method 700 may further include any of the methods above, further comprising assigning sequential numbers to a corresponding frame of the plurality of frames, wherein transmitting the plurality of frames comprises transmitting the plurality of frames based on the sequential numbers of the plurality of frames.

Alternatively or additionally, the method 700 may further include any of the methods above, wherein the plurality of frames includes at least one of a first frame of the plurality of frames comprising a number of the plurality of frames or a last frame comprising an indicator indicating an end of a transmission of the plurality of frames (e.g., the last frame containing the last certificate partition).

Alternatively or additionally, the method 700 may further include any of the methods above, further comprising receiving a value of the periodicity.

Alternatively or additionally, the method 700 may further include any of the methods above, wherein receiving the value comprises obtaining a security profile associated with the mobile device and obtaining the value of the periodicity from the security profile.

Alternatively or additionally, the method 700 may further include any of the methods above, wherein receiving the value comprises receiving a mobile device identification and mobile device identification configuration parameters from a network and obtaining the value of the periodicity from the mobile device identification configuration parameters.

Alternatively or additionally, the method 700 may further include any of the methods above, wherein receiving the value comprises dynamically receiving the value from the network via a system information broadcasting message or a radio resource configuration message wherein receiving the value comprises dynamically receiving an updated value from the network via a radio resource reconfiguration message.

Alternatively or additionally, the method 700 may further include any of the methods above, wherein the periodicity is determined based on a received signal strength indication (RSSI), a radio frequency, or one or more network or link quality of service (QOS) parameters.

Alternatively or additionally, the method 700 may further include any of the methods above, wherein the mobile device is a unmanned aircraft vehicle. Other examples of the mobile device include a ground vehicle, a fixed or mobile robotic platform, a control actuator, a fixed or mobile sensing electronic device, a smart device, etc.

Figure 8:
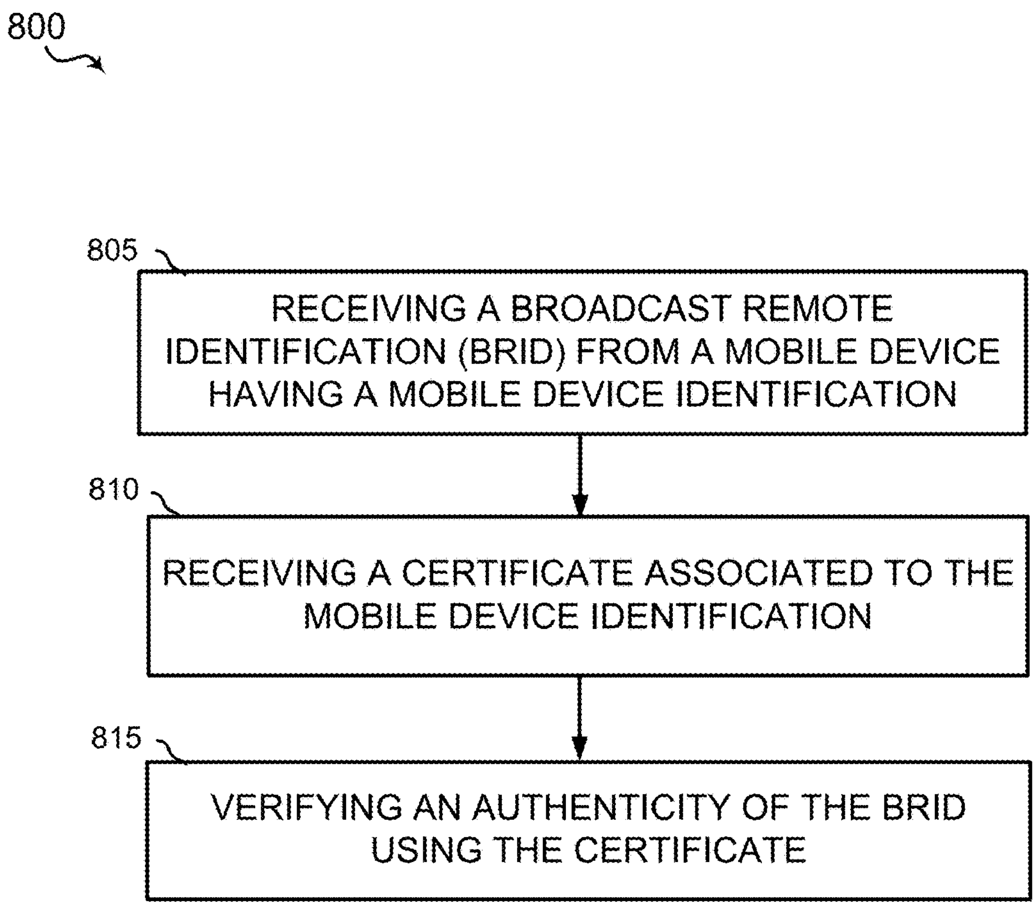
FIG. 8 is a process flow diagram of an example of a method for authenticating by a receiver.

Turning to FIG. 8, an example of a method 800 for verifying the authenticity of a BRID may be performed by a receiver. Examples of the receiver may include the UE 110, the UAV 502, the UAV 602, or other devices.

At block 805, the method 800 may receive a broadcast remote identification (BRID) from a mobile device having a mobile device identification. For example, the communication component 222 of the UE 110 may receive a broadcast remote identification (BRID) from a mobile device having a mobile device identification as described above with respect to FIGS. 4-6. The one or more antennas 265 may receive electro-magnetic signals carrying the BRID. The RF front end 288 may receive electrical signals generated from the electro-magnetic signals. The RF front end 288 may filter and/or amplify the electrical signals. The transceiver 202 or the receiver 206 may receive the electrical signals from the RF front end 288, and convert the electrical signals into the BIRD, and send the BRID to the communication component 222.

In certain implementations, the processor 212, the modem 220, the communication component 222, the transceiver 202, the receiver 206, the transmitter 208, the RF front end 288, and/or the subcomponents of the RF front end 288 may be configured to and/or may define means for receiving a broadcast remote identification (BRID) from a mobile device having a mobile device identification.

At block 810, the method 800 may receive a certificate associated to the mobile device identification. For example, the communication component 222 of the UE 110 may receive a certificate associated to the mobile device identification as described above with respect to FIGS. 4-6. The one or more antennas 265 may receive electro-magnetic signals carrying the certificate. The RF front end 288 may receive electrical signals generated from the electro-magnetic signals. The RF front end 288 may filter and/or amplify the electrical signals. The transceiver 202 or the receiver 206 may receive the electrical signals from the RF front end 288, and convert the electrical signals into the certificate, and send the certificate to the communication component 222.

In certain implementations, the processor 212, the modem 220, the communication component 222, the transceiver 202, the receiver 206, the transmitter 208, the RF front end 288, and/or the subcomponents of the RF front end 288 may be configured to and/or may define means for receiving a certificate associated to the mobile device identification.

At block 815, the method 800 may verify an authenticity of the BRID using the certificate. For example, the certificate component 224 of the UE 110 may verify the authenticity of the BRID using the certificate as described above.

In certain implementations, the processor 212, the modem 220, the processor 212, the memory 216, the applications 275, the modem 220, and/or the certificate component 224 may be configured to and/or may define means for verifying an authenticity of the BRID using the certificate.

In an alternative implementation, the receiver may receiver an authenticated message (e.g., a signed broadcast message) instead of the BRID. The receiver may verify the authenticity of the authenticated message using the certificate. The receiver may perform the verification without ever receiving the BRID. For example, the authenticated message may be a collision avoidance message. The receiver may verify the authenticity of the authenticated message without knowing the BRID of the broadcasting device.

Alternatively or additionally, the method 800 may further include any of the methods above, wherein receiving the certificate comprises receiving, sequentially at a periodicity from the mobile device, a plurality of frames each comprising a certificate segment of a plurality of certificate segments, obtaining the plurality of certificate segments from the a plurality of frames, and concatenating the plurality of certificate segments based on sequences of the plurality of frames to generate the certificate.

Alternatively or additionally, the method 800 may further include any of the methods above, wherein receiving the certificate comprises receiving the certificate associated with the mobile device identification, wherein the certificate is broadcasted by a network.

Alternatively or additionally, the method 800 may further include any of the methods above, wherein receiving the certificate comprises obtaining the mobile device identification from the broadcast remote identification, transmitting a request message including the mobile device identification to a network requesting the certificate associated with the mobile device identification, and receiving the certificate associated to the mobile device identification from the network.

Alternatively or additionally, the method 800 may further include any of the methods above, wherein obtaining the mobile device identification comprises calculating a cryptographic hash of the certificate.

Alternatively or additionally, the method 800 may further include any of the methods above, wherein a cryptographic hash or a component of the cryptographic hash of the certificate constitutes the broadcast remote identification and is used as the mobile device identification or an index to the mobile device identification.

Alternatively or additionally, the method 800 may further include any of the methods above, further comprising generating the mobile device identification by calculating the cryptographic hash of the certificate.

Figure 9:
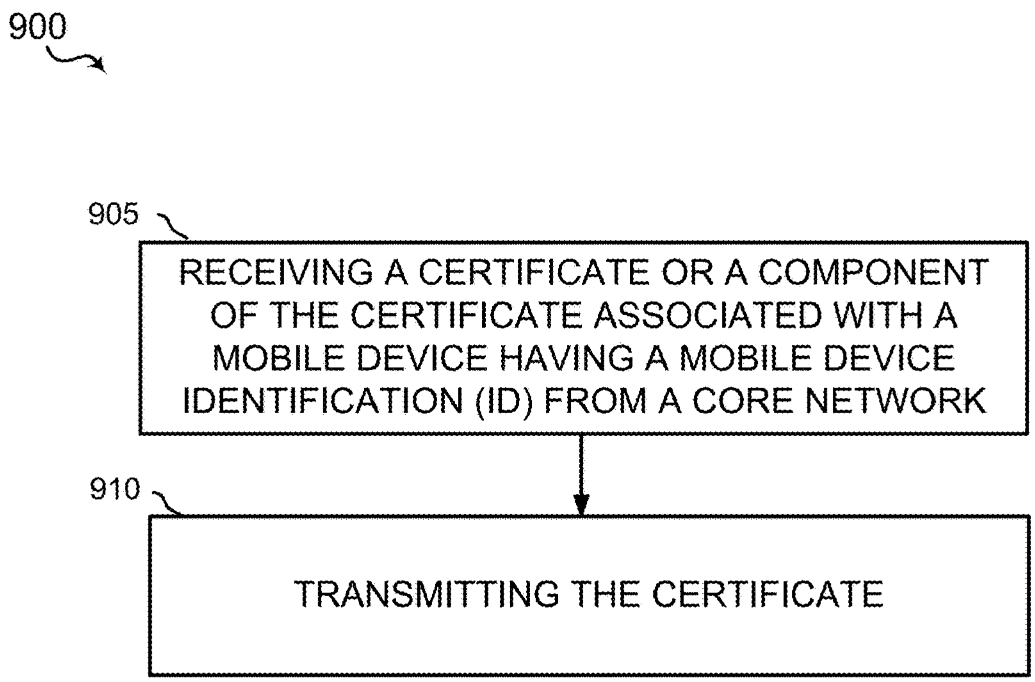
FIG. 9 is a process flow diagram of an example of a method for distributing certificates by a base station.

Turning to FIG. 9, in certain implementations, a method 900 of distributing a certificate may be performed by performed by the one or more of the processor 312, the memory 316, the applications 375, the modem 320, the transceiver 302 and/or its subcomponents, the RF front end 388 and/or its subcomponents, and/or the communication component 322 of the BS 105 (e.g., the first BS 105*a* or the second BS 105*b*) in the wireless communication network 100.

At block 905, the method 900 may receive a certificate or a component of the certificate associated with a mobile device having a mobile device identification (ID) from a core network. For example, the communication component 322 of the UE 110 may receive a certificate associated with a mobile device having a mobile device identification (ID) from a core network as described above with respect to FIGS. 4-6. The one or more antennas 365 may receive electro-magnetic signals carrying the certificate. The RF front end 388 may receive electrical signals generated from the electro-magnetic signals. The RF front end 388 may filter and/or amplify the electrical signals. The transceiver 302 or the receiver 306 may receive the electrical signals from the RF front end 388, and convert the electrical signals into the certificate, and send the certificate to the communication component 322.

In certain implementations, the processor 312, the modem 320, the communication component 322, the transceiver 302, the receiver 306, the transmitter 308, the RF front end 388, and/or the subcomponents of the RF front end 388 may be configured to and/or may define means for receiving a certificate or a component of the certificate associated with a mobile device having a mobile device identification (ID) from a core network.

At block 910, the method 900 may transmit the certificate. For example, the communication component 322 of the UE 110 may transmit the certificate. The communication component 322 may send the plurality of frames to the transceiver 302 or the transmitter 308. The transceiver 302 or the transmitter 308 may convert the certificate to electrical signals and send to the RF front end 388. The RF front end 388 may filter and/or amplify the electrical signals. The RF front end 388 may send the electrical signals as electro-magnetic signals via the one or more antennas 365.

In certain implementations, the processor 312, the modem 320, the communication component 322, the transceiver 302, the receiver 306, the transmitter 308, the RF front end 388, and/or the subcomponents of the RF front end 388 may be configured to and/or may define means for transmitting the certificate.

Alternatively or additionally, the method 900 may further include any of the methods above, further comprising receiving, prior to transmitting the certificate, a request message for the certificate associated to a mobile device identification from one or more receivers, wherein the request message comprises the mobile device identification and wherein transmitting the certificate comprises transmitting the certificate to the one or more receivers.

Alternatively or additionally, the method 900 may further include any of the methods above, wherein transmitting the certificate comprises broadcasting the certificate and the mobile device identification associated with the certificate.

Alternatively or additionally, the method 900 may further include any of the methods above, further comprising receiving a travel plan indicating that the mobile device is scheduled to enter a geographical area, determining the coverage area associated with the geographical area, determining the one or more base stations associated with the coverage area, wherein transmitting the certificate comprises transmitting the certificate to the one or more base stations prior to the mobile device entering the geographical area.

Additional Implementations

Aspects of the present disclosure include methods by a mobile device for obtaining at least one certificate, partitioning the at least one certificate into a plurality of certificate segments, embedding the plurality of certificate segments into a corresponding frame of a plurality of frames, and transmitting, sequentially, the plurality of frames at a periodicity.

Aspects of the present disclosure include the method above, further comprising assigning sequential numbers to a corresponding frame of the plurality of frames, wherein transmitting the plurality of frames comprises transmitting the plurality of frames based on the sequential numbers of the plurality of frames.

Aspects of the present disclosure include any of the methods above, wherein the plurality of frames includes at least one of a first frame of the plurality of frames comprising a number of the plurality of frames or a last frame comprising an indicator indicating an end of a transmission of the plurality of frames.

Aspects of the present disclosure include any of the methods above, further comprising receiving a value of the periodicity prior to transmitting the plurality of frames.

Aspects of the present disclosure include any of the methods above, wherein receiving the value comprises obtaining a security profile associated with the mobile device, and obtaining the value of the periodicity from the security profile.

Aspects of the present disclosure include any of the methods above, wherein receiving the value comprises receiving a mobile device identification and mobile device identification configuration parameters from a network, and obtaining the value of the periodicity from the mobile device identification configuration parameters.

Aspects of the present disclosure include any of the methods above, wherein receiving the value comprises dynamically receiving the value from a network via a system information broadcasting message or a radio resource configuration message.

Aspects of the present disclosure include any of the methods above, wherein receiving the value comprises dynamically receiving an updated value from the network via a radio resource reconfiguration message.

Aspects of the present disclosure include any of the methods above, wherein the periodicity is determined based on a received signal strength indication (RSSI), a radio frequency, or one or more network or link quality of service (QOS) parameters.

Aspects of the present disclosure include any of the methods above, wherein the mobile device is an unmanned aircraft vehicle, a ground vehicle, a fixed or moving robotics platform, a control actuator, or a sensing electronic device.

Aspects of the present disclosure include any of the methods above, wherein the at least one certificate includes a trust chain file indicating one or more hierarchies of certificates.

Other aspects of the present disclosure include a mobile device having a memory comprising instructions, a transceiver, and one or more processors operatively coupled with the memory and the transceiver, the one or more processors configured to execute instructions in the memory to obtain at least one certificate, partition the at least one certificate into a plurality of certificate segments, embed the plurality of certificate segments into a corresponding frame of a plurality of frames, and transmit sequentially, the plurality of frames at a periodicity.

Aspects of the present disclosure include the mobile device above, wherein the one or more processors are further configured to assign sequential numbers to a corresponding frame of the plurality of frames, wherein transmitting the plurality of frames comprises transmitting the plurality of frames based on the sequential numbers of the plurality of frames.

Aspects of the present disclosure include any of the mobile devices above, wherein the plurality of frames includes at least one of a first frame of the plurality of frames comprising a number of the plurality of frames or a last frame comprising an indicator indicating an end of a transmission of the plurality of frames.

Aspects of the present disclosure include any of the mobile devices above, wherein the one or more processors are further configured to receive a value of the periodicity prior to transmitting the plurality of frames.

Aspects of the present disclosure include any of the mobile devices above, wherein receiving the value comprises obtaining a security profile associated with the mobile device, and obtaining the value of the periodicity from the security profile.

Aspects of the present disclosure include any of the mobile devices above, wherein receiving the value comprises receiving a mobile device identification and mobile device identification configuration parameters from a network, and obtaining the value of the periodicity from the mobile device identification configuration parameters.

Aspects of the present disclosure include any of the mobile devices above, wherein receiving the value comprises dynamically receiving the value from a network via a system information broadcasting message or a radio resource configuration message.

Aspects of the present disclosure include any of the mobile devices above, wherein receiving the value comprises dynamically receiving an updated value from the network via a radio resource reconfiguration message.

Aspects of the present disclosure include any of the mobile devices above, wherein the periodicity is determined based on a received signal strength indication (RSSI), a radio frequency, or one or more network or link quality of service (QOS) parameters.

Aspects of the present disclosure include any of the mobile devices above, wherein the mobile device is an unmanned aircraft vehicle, a ground vehicle, a fixed or moving robotics platform, a control actuator, or a sensing electronic device.

Aspects of the present disclosure include any of the mobile devices above, wherein the at least one certificate includes a trust chain file indicating one or more hierarchies of certificates.

An aspect of the present disclosure includes a mobile device including means for obtaining at least one certificate, means for partitioning the at least one certificate into a plurality of certificate segments, means for embedding the plurality of certificate segments into a corresponding frame of a plurality of frames, and means for transmitting, sequentially, the plurality of frames at a periodicity.

Aspects of the present disclosure include the mobile device above, further comprising means for assigning sequential numbers to a corresponding frame of the plurality of frames, wherein transmitting the plurality of frames comprises transmitting the plurality of frames based on the sequential numbers of the plurality of frames.

Aspects of the present disclosure include any of the mobile devices above, wherein the plurality of frames includes at least one of a first frame of the plurality of frames comprising a number of the plurality of frames or a last frame comprising an indicator indicating an end of a transmission of the plurality of frames.

Aspects of the present disclosure include any of the mobile devices above, further comprising means for receiving a value of the periodicity prior to transmitting the plurality of frames.

Aspects of the present disclosure include any of the mobile devices above, wherein means for receiving the value comprises means for obtaining a security profile associated with the mobile device, and means for obtaining the value of the periodicity from the security profile.

Aspects of the present disclosure include any of the mobile devices above, wherein means for receiving the value comprises means for receiving a mobile device identification and mobile device identification configuration parameters from a network, and means for obtaining the value of the periodicity from the mobile device identification configuration parameters.

Aspects of the present disclosure include any of the mobile devices above, wherein means for receiving the value comprises means for dynamically receiving the value from a network via a system information broadcasting message or a radio resource configuration message.

Aspects of the present disclosure include any of the mobile devices above, wherein means for receiving the value comprises means for dynamically receiving an updated value from the network via a radio resource reconfiguration message.

Aspects of the present disclosure include any of the mobile devices above, wherein the periodicity is determined based on a received signal strength indication (RSSI), a radio frequency, or one or more network or link quality of service (QOS) parameters.

Aspects of the present disclosure include any of the mobile devices above, wherein the mobile device is an unmanned aircraft vehicle, a ground vehicle, a fixed or moving robotics platform, a control actuator, or a sensing electronic device.

Aspects of the present disclosure include any of the mobile devices above, wherein the at least one certificate includes a trust chain file indicating one or more hierarchies of certificates.

Some aspects of the present disclosure include non-transitory computer readable media having instructions stored therein that, when executed by one or more processors of a mobile device, cause the one or more processors to obtain at least one certificate, partition the at least one certificate into a plurality of certificate segments, embed the plurality of certificate segments into a corresponding frame of a plurality of frames, and transmit sequentially, the plurality of frames at a periodicity.

Aspects of the present disclosure include the non-transitory computer readable medium above, further comprising instructions, when executed by the one or more processors, cause the one or more processors to assign sequential numbers to a corresponding frame of the plurality of frames, wherein transmitting the plurality of frames comprises transmitting the plurality of frames based on the sequential numbers of the plurality of frames.

Aspects of the present disclosure include any of the non-transitory computer readable media above, wherein the plurality of frames includes at least one of a first frame of the plurality of frames comprising a number of the plurality of frames or a last frame comprising an indicator indicating an end of a transmission of the plurality of frames.

Aspects of the present disclosure include any of the non-transitory computer readable media above, further comprising instructions, when executed by the one or more processors, cause the one or more processors to receive a value of the periodicity prior to transmitting the plurality of frames.

Aspects of the present disclosure include any of the non-transitory computer readable media above, wherein the instructions for receiving the value comprises instructions for obtaining a security profile associated with the mobile device, and obtaining the value of the periodicity from the security profile.

Aspects of the present disclosure include any of the non-transitory computer readable media above, wherein the instructions for receiving the value comprises instructions for receiving a mobile device identification and mobile device identification configuration parameters from a network, and obtaining the value of the periodicity from the mobile device identification configuration parameters.

Aspects of the present disclosure include any of the non-transitory computer readable media above, wherein the instructions for receiving the value comprises instructions for dynamically receiving the value from a network via a system information broadcasting message or a radio resource configuration message.

Aspects of the present disclosure include any of the non-transitory computer readable media above, wherein the instructions for receiving the value comprises dynamically receiving an updated value from the network via a radio resource reconfiguration message.

Aspects of the present disclosure include any of the non-transitory computer readable media above, wherein the periodicity is determined based on a received signal strength indication (RSSI), a radio frequency, or one or more network or link quality of service (QOS) parameters.

Aspects of the present disclosure include any of the non-transitory computer readable media above, wherein the mobile device is an unmanned aircraft vehicle, a ground vehicle, a fixed or moving robotics platform, a control actuator, or a sensing electronic device.

Aspects of the present disclosure include any of the non-transitory computer readable media above, wherein the at least one certificate includes a trust chain file indicating one or more hierarchies of certificates.

Aspects of the present disclosure include methods by a receiver for receiving a broadcast remote identification from a mobile device having a mobile device identification, receiving a certificate associated to the mobile device identification, and verifying an authenticity of the broadcast remote identification using the certificate.

Aspects of the present disclosure include the method above, wherein receiving the certificate comprises receiving, sequentially at a periodicity from the mobile device, a plurality of frames each comprising a certificate segment of a plurality of certificate segments, obtaining the plurality of certificate segments from the plurality of frames, and concatenating the plurality of certificate segments based on sequences of the plurality of frames to generate the certificate.

Aspects of the present disclosure include any of the methods above, wherein receiving the certificate comprises receiving the certificate associated with the mobile device identification, wherein the certificate is broadcasted by a network.

Aspects of the present disclosure include any of the methods above, wherein receiving the certificate comprises obtaining the mobile device identification from the broadcast remote identification, transmitting a request message including the mobile device identification to a network requesting the certificate associated with the mobile device identification, and receiving the certificate associated to the mobile device identification from the network.

Aspects of the present disclosure include any of the methods above, wherein obtaining the mobile device identification comprises calculating a cryptographic hash of the certificate.

Aspects of the present disclosure include any of the methods above, wherein a cryptographic hash or a component of the cryptographic hash of the certificate constitutes the broadcast remote identification and is used as the mobile device identification or an index to the mobile device identification.

Aspects of the present disclosure include any of the methods above, further comprising generating the mobile device identification by calculating the cryptographic hash of the certificate.

Other aspects of the present disclosure include a receiver having a memory comprising instructions, a transceiver, and one or more processors operatively coupled with the memory and the transceiver, the one or more processors configured to execute instructions in the memory to receive a broadcast remote identification from a mobile device having a mobile device identification, receive a certificate associated to the mobile device identification, and verify an authenticity of the broadcast remote identification using the certificate.

Aspects of the present disclosure include the receiver above, wherein receiving the certificate comprises receiving, sequentially at a periodicity from the mobile device, a plurality of frames each comprising a certificate segment of a plurality of certificate segments, obtaining the plurality of certificate segments from the plurality of frames, and concatenating the plurality of certificate segments based on sequences of the plurality of frames to generate the certificate.

Aspects of the present disclosure include any of the receivers above, wherein receiving the certificate comprises receiving the certificate associated with the mobile device identification, wherein the certificate is broadcasted by a network.

Aspects of the present disclosure include any of the receivers above, wherein receiving the certificate comprises obtaining the mobile device identification from the broadcast remote identification, transmitting a request message including the mobile device identification to a network requesting the certificate associated with the mobile device identification, and receiving the certificate associated to the mobile device identification from the network.

Aspects of the present disclosure include any of the receivers above, wherein obtaining the mobile device identification comprises calculating a cryptographic hash of the certificate.

Aspects of the present disclosure include any of the receivers above, wherein a cryptographic hash or a component of the cryptographic hash of the certificate constitutes the broadcast remote identification and is used as the mobile device identification or an index to the mobile device identification.

Aspects of the present disclosure include any of the receivers above, wherein the one or more processors are further configured to generate the mobile device identification by calculating the cryptographic hash of the certificate.

An aspect of the present disclosure includes a receiver including means for receiving a broadcast remote identification from a mobile device having a mobile device identification, means for receiving a certificate associated to the mobile device identification, and means for verifying an authenticity of the broadcast remote identification using the certificate.

Aspects of the present disclosure include any of the receivers above, wherein means for receiving the certificate comprises means for receiving, sequentially at a periodicity from the mobile device, a plurality of frames each comprising a certificate segment of a plurality of certificate segments, means for obtaining the plurality of certificate segments from the plurality of frames, and means for concatenating the plurality of certificate segments based on sequences of the plurality of frames to generate the certificate.

Aspects of the present disclosure include the receiver above, wherein means for receiving the certificate comprises means for receiving the certificate associated with the mobile device identification, wherein the certificate is broadcasted by a network.

Aspects of the present disclosure include any of the receivers above, wherein means for receiving the certificate comprises means for obtaining the mobile device identification from the broadcast remote identification, means for transmitting a request message including the mobile device identification to a network requesting the certificate associated with the mobile device identification, and means for receiving the certificate associated to the mobile device identification from the network.

Aspects of the present disclosure include any of the receivers above, wherein means for obtaining the mobile device identification comprises means for calculating a cryptographic hash of the certificate.

Aspects of the present disclosure include any of the receivers above, wherein a cryptographic hash or a component of the cryptographic hash of the certificate constitutes the broadcast remote identification and is used as the mobile device identification or an index to the mobile device identification.

Aspects of the present disclosure include any of the receivers above, further comprising means for generating the mobile device identification by calculating the cryptographic hash of the certificate.

Some aspects of the present disclosure include non-transitory computer readable media having instructions stored therein that, when executed by one or more processors of a receiver, cause the one or more processors to receive a broadcast remote identification from a mobile device having a mobile device identification, receive a certificate associated to the mobile device identification, and verify an authenticity of the broadcast remote identification using the certificate.

Aspects of the present disclosure include the non-transitory computer readable medium above, wherein the instructions for receiving the certificate comprises instructions for receiving, sequentially at a periodicity from the mobile device, a plurality of frames each comprising a certificate segment of a plurality of certificate segments, obtaining the plurality of certificate segments from the plurality of frames, and concatenating the plurality of certificate segments based on sequences of the plurality of frames to generate the certificate.

Aspects of the present disclosure include any of the non-transitory computer readable media above, wherein the instructions for receiving the certificate comprises instructions for receiving the certificate associated with the mobile device identification, wherein the certificate is broadcasted by a network.

Aspects of the present disclosure include any of the non-transitory computer readable media above, wherein the instructions for receiving the certificate comprises instructions for obtaining the mobile device identification from the broadcast remote identification, transmitting a request message including the mobile device identification to a network requesting the certificate associated with the mobile device identification, and receiving the certificate associated to the mobile device identification from the network.

Aspects of the present disclosure include any of the non-transitory computer readable media above, wherein the instructions for obtaining the mobile device identification comprises instructions for calculating a cryptographic hash of the certificate.

Aspects of the present disclosure include any of the non-transitory computer readable media above, wherein a cryptographic hash or a component of the cryptographic hash of the certificate constitutes the broadcast remote identification and is used as the mobile device identification or an index to the mobile device identification.

Aspects of the present disclosure include any of the non-transitory computer readable media above, further comprising instructions, when executed by the one or more processors, cause the one or more processors to generate the mobile device identification by calculating the cryptographic hash of the certificate.

Aspects of the present disclosure include methods by a base station (BS) for receiving a certificate or a component of the certificate associated with a mobile device having a mobile device identification (ID) from a core network, and transmitting the certificate.

Aspects of the present disclosure include the method above, further comprising receiving, prior to transmitting the certificate, a request message for the certificate associated to a mobile device identification from one or more receivers, wherein the request message comprises the mobile device identification, and wherein transmitting the certificate comprises transmitting the certificate to the one or more receivers.

Aspects of the present disclosure include any of the methods above, wherein transmitting the certificate comprises broadcasting the certificate and the mobile device identification associated with the certificate.

Aspects of the present disclosure include any of the methods above, further comprising receiving a travel plan indicating that the mobile device is scheduled to enter a geographical area, determining a coverage area associated with the geographical area, determining one or more base stations associated with the coverage area; and wherein transmitting the certificate comprises transmitting the certificate to the one or more base stations prior to the mobile device entering the geographical area.

Aspects of the present disclosure include any of the methods above, further comprising receiving a message, and verifying an authenticity of the mobile device by successfully verifying an authenticity of the message using the certificate.

Other aspects of the present disclosure include a base station (BS) having a memory comprising instructions, a transceiver, and one or more processors operatively coupled with the memory and the transceiver, the one or more processors configured to execute instructions in the memory to receive a certificate or a component of the certificate associated with a mobile device having a mobile device identification (ID) from a core network, and transmit the certificate.

Aspects of the present disclosure include the BS above, wherein the one or more processors are further configured to receive prior to transmitting the certificate, a request message for the certificate associated to a mobile device identification from one or more receivers, wherein the request message comprises the mobile device identification, and wherein transmitting the certificate comprises transmitting the certificate to the one or more receivers.

Aspects of the present disclosure include any of the BSs above, wherein transmitting the certificate comprises broadcasting the certificate and the mobile device identification associated with the certificate.

Aspects of the present disclosure include any of the BSs above, wherein the one or more processors are further configured to receive a travel plan indicating that the mobile device is scheduled to enter a geographical area, determine a coverage area associated with the geographical area, determine one or more base stations associated with the coverage area; and wherein transmitting the certificate comprises transmitting the certificate to the one or more base stations prior to the mobile device entering the geographical area.

Aspects of the present disclosure include any of the BSs above, wherein the one or more processors are further configured to receive a message, and verify an authenticity of the mobile device by successfully verifying an authenticity of the message using the certificate.

An aspect of the present disclosure includes a base station (BS) including means for receiving a certificate or a component of the certificate associated with a mobile device having a mobile device identification (ID) from a core network, and means for transmitting the certificate.

Aspects of the present disclosure include the BS above, further comprising means for receiving, prior to transmitting the certificate, a request message for the certificate associated to a mobile device identification from one or more receivers, wherein the request message comprises the mobile device identification, and wherein transmitting the certificate comprises transmitting the certificate to the one or more receivers.

Aspects of the present disclosure include any of the BSs above, further comprising means for broadcasting the certificate and the mobile device identification associated with the certificate.

Aspects of the present disclosure include any of the BSs above, further comprising means for receiving a travel plan indicating that the mobile device is scheduled to enter a geographical area, means for determining a coverage area associated with the geographical area, means for determining one or more base stations associated with the coverage area; and wherein transmitting the certificate comprises transmitting the certificate to the one or more base stations prior to the mobile device entering the geographical area.

Aspects of the present disclosure include any of the BSs above, further comprising means for receiving a message, and means for verifying an authenticity of the mobile device by successfully verifying an authenticity of the message using the certificate.

Some aspects of the present disclosure include non-transitory computer readable media having instructions stored therein that, when executed by one or more processors of a base station (BS), cause the one or more processors to receive a certificate or a component of the certificate associated with a mobile device having a mobile device identification (ID) from a core network, and transmit the certificate.

Aspects of the present disclosure include the non-transitory computer readable medium above, further comprising instructions, when executed by the one or more processors, cause the one or more processors to receive prior to transmitting the certificate, a request message for the certificate associated to a mobile device identification from one or more receivers, wherein the request message comprises the mobile device identification, and wherein transmitting the certificate comprises transmitting the certificate to the one or more receivers.

Aspects of the present disclosure include any of the non-transitory computer readable media above, wherein the instructions for transmitting the certificate comprises instructions for broadcasting the certificate and the mobile device identification associated with the certificate.

Aspects of the present disclosure include any of the non-transitory computer readable media above, further comprising instructions, when executed by the one or more processors, cause the one or more processors to receive a travel plan indicating that the mobile device is scheduled to enter a geographical area, determine a coverage area associated with the geographical area, determine one or more base stations associated with the coverage area; and wherein transmitting the certificate comprises transmitting the certificate to the one or more base stations prior to the mobile device entering the geographical area.

Aspects of the present disclosure include any of the non-transitory computer readable media above, further comprising instructions, when executed by the one or more processors, cause the one or more processors to receive a message, and verify an authenticity of the mobile device by successfully verifying an authenticity of the message using the certificate.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. For example, changes may be made in the function and arrangement of elements discussed without departing from the scope of the disclosure. Also, various examples may omit, substitute, or add various procedures or components as appropriate. For instance, the methods described may be performed in an order different from that described, and various steps may be added, omitted, or combined. Also, features described with respect to some examples may be combined in other examples. In some instances, well-known structures and apparatuses are shown in block diagram form in order to avoid obscuring the concepts of the described examples.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description herein, however, describes an LTE/LTE-A system or 5G system for purposes of example, and LTE terminology is used in much of the description below, although the techniques may be applicable other next generation communication systems.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above may be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that may be accessed by a general purpose or special purpose computer. By way of example, and not limitation, computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A receiver, comprising:

one or more memories comprising instructions;

a transceiver; and one or more processors operatively coupled with the one or more memories and the transceiver, the one or more processors configured to:

receive a broadcast remote identification from a mobile device having a mobile device identification;

receive a certificate associated with the mobile device identification; and verify an authenticity of the broadcast remote identification using the certificate;

wherein to receive the certificate, the one or more processors are configured to:

receive, sequentially at a first instance of a first periodicity from the mobile device, a first plurality of frames each comprising a certificate segment of at least a first portion of a first plurality of certificate segments, wherein the first periodicity is determined based on one or more of radio frequency (RF) interference, a number of requests for the certificate, a received signal strength indication of a communication channel, a quality of service of the communication channel, or a frequency of the communication channel;

obtain the first plurality of certificate segments from the first plurality of frames; and concatenate a first subset of the first plurality of certificate segments based on first sequences of the first plurality of frames to generate the certificate.

2. The receiver of claim 1, wherein to receive the certificate, the one or more processors are further configured to:

receive, sequentially at a second instance of a second periodicity from the mobile device, a second plurality of frames each comprising a respective certificate segment of at least a second portion of a second plurality of certificate segments, wherein a transition from the first plurality of certificate segments to the second plurality of certificate segments is based on at least a change in one or more of the RF interference, the number of requests for the certificate, the received signal strength indication of the communication channel, the quality of service of the communication channel, or the frequency of the communication channel, the second plurality of certificate segments being different than the first plurality of certificate segments and the first periodicity is different than the second periodicity;

obtain the second plurality of certificate segments from the second plurality of frames; and concatenate a second subset of the second plurality of certificate segments based on second sequences of the second plurality of frames to generate the certificate.

3. The receiver of claim 2, wherein the first sequences indicate a first order of the first plurality of certificate segments and the second sequences indicate a second order of the second plurality of certificate segments.

4. The receiver of claim 2, wherein:

the first plurality of frames includes at least one of a first frame of the first plurality of frames comprising a first number of the first plurality of frames or a first last frame comprising a first indicator indicating a first end of a first transmission of the first plurality of frames; and the second plurality of frames includes at least one of a second frame of the second plurality of frames comprising a second number of the second plurality of frames or a second last frame comprising a second indicator indicating a second end of a second transmission of the second plurality of frames.

5. The receiver of claim 1, wherein to receive the certificate, the one or more processors are further configured to:

receive the certificate associated with the mobile device identification, wherein the certificate is broadcasted by a network.

6. The receiver of claim 1, wherein to receive the certificate, the one or more processors are further configured to:

obtain the mobile device identification from the broadcast remote identification;

transmit a request message including the mobile device identification to a network requesting the certificate associated with the mobile device identification; and receive the certificate associated with the mobile device identification from the network.

7. The receiver of claim 6, wherein to obtain the mobile device identification, the one or more processors are further configured to:

calculate a cryptographic hash of the certificate.

8. The receiver of claim 1, wherein:

a cryptographic hash or a component of the cryptographic hash of the certificate constitutes the broadcast remote identification and is used as the mobile device identification or an index to the mobile device identification.

9. The receiver of claim 8, wherein the one or more processors are further configured to:

generate the mobile device identification by calculating the cryptographic hash of the certificate.

10. A method by a receiver, comprising:

receiving a broadcast remote identification from a mobile device having a mobile device identification;

receiving a certificate associated with the mobile device identification; and verifying an authenticity of the broadcast remote identification using the certificate;

wherein receiving the certificate comprises:

receiving, sequentially at a first instance of a first periodicity from the mobile device, a first plurality of frames each comprising a certificate segment of at least a first portion of a first plurality of certificate segments, wherein the first periodicity is determined based on one or more of radio frequency (RF) interference, a number of requests for the certificate, a received signal strength indication of a communication channel, a quality of service of the communication channel, or a frequency of the communication channel;

obtaining the first plurality of certificate segments from the first plurality of frames; and concatenating a first subset of the first plurality of certificate segments based on first sequences of the first plurality of frames to generate the certificate.

11. The method of claim 10, wherein receiving the certificate comprises:

receiving, sequentially at a second instance of a second periodicity from the mobile device, a second plurality of frames each comprising a respective certificate segment of at least a second portion of a second plurality of certificate segments, wherein a transition from the first plurality of certificate segments to the second plurality of certificate segments is based on at least a change in one or more of the RF interference, the number of requests for the certificate, the received signal strength indication of the communication channel, the quality of service of the communication channel, or the frequency of the communication channel, the second plurality of certificate segments being different than the first plurality of certificate segments and the first periodicity is different than the second periodicity;

obtaining the second plurality of certificate segments from the second plurality of frames; and concatenating a second subset of the second plurality of certificate segments based on second sequences of the second plurality of frames to generate the certificate.

12. The method of claim 11, wherein the first sequences indicate a first order of the first plurality of certificate segments and the second sequences indicate a second order of the second plurality of certificate segments.

13. The method of claim 11, wherein:

the first plurality of frames includes at least one of a first frame of the first plurality of frames comprising a first number of the first plurality of frames or a first last frame comprising a first indicator indicating a first end of a first transmission of the first plurality of frames; and the second plurality of frames includes at least one of a second frame of the second plurality of frames comprising a second number of the second plurality of frames or a second last frame comprising a second indicator indicating a second end of a second transmission of the second plurality of frames.

14. The method of claim 10, wherein receiving the certificate comprises:

receiving the certificate associated with the mobile device identification, wherein the certificate is broadcasted by a network.

15. The method of claim 10, wherein receiving the certificate comprises:

obtaining the mobile device identification from the broadcast remote identification;

transmitting a request message including the mobile device identification to a network requesting the certificate associated with the mobile device identification; and receiving the certificate associated to the mobile device identification from the network.

16. The method of claim 15, wherein obtaining the mobile device identification comprises:

calculating a cryptographic hash of the certificate.

17. The method of claim 10, wherein:

a cryptographic hash or a component of the cryptographic hash of the certificate constitutes the broadcast remote identification and is used as the mobile device identification or an index to the mobile device identification.

18. The method of claim 17, further comprising generating the mobile device identification by calculating the cryptographic hash of the certificate.

* * * * *